(12) United States Patent
Kitagawa et al.

(10) Patent No.: US 7,864,715 B2
(45) Date of Patent: Jan. 4, 2011

(54) DATA COMMUNICATION METHOD, COMMUNICATION SERVER SYSTEM, AND COMMUNICATION TERMINAL

(75) Inventors: Masahiko Kitagawa, Kanagawa (JP); Shuji Ishikawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 557 days.

(21) Appl. No.: 11/392,384

(22) Filed: Mar. 28, 2006

(65) Prior Publication Data

US 2006/0215641 A1 Sep. 28, 2006

(30) Foreign Application Priority Data

Mar. 28, 2005 (JP) ............................... 2005-091683
Apr. 6, 2005 (JP) ............................... 2005-109423

(51) Int. Cl.
*G01R 31/08* (2006.01)
*H04H 20/71* (2008.01)

(52) U.S. Cl. .................... 370/260; 370/237; 370/241.1; 370/312; 455/416; 455/518

(58) Field of Classification Search .............. 370/236.2, 370/237, 312, 241.1, 259–271; 455/416, 455/519, 518
See application file for complete search history.

(56) References Cited

U.S. PATENT DOCUMENTS

| | | | | |
|---|---|---|---|---|
| 6,021,124 A * | 2/2000 | Haartsen | ..................... | 370/336 |
| 6,085,243 A * | 7/2000 | Fletcher et al. | ............. | 709/224 |
| 6,963,543 B2 * | 11/2005 | Diep et al. | .................. | 370/261 |
| 6,970,926 B1 * | 11/2005 | Needham et al. | ............ | 709/225 |
| 7,170,863 B1 * | 1/2007 | Denman et al. | ............. | 370/260 |
| 7,408,890 B1 * | 8/2008 | Doran et al. | ................. | 370/261 |
| 2003/0002442 A1* | 1/2003 | Flammer et al. | ............ | 370/230 |
| 2003/0154249 A1* | 8/2003 | Crockett et al. | ............. | 709/204 |
| 2004/0082352 A1* | 4/2004 | Keating et al. | .............. | 455/519 |
| 2005/0032538 A1* | 2/2005 | Noel et al. | ................... | 455/518 |
| 2006/0040683 A1* | 2/2006 | Lappalainen et al. | ........ | 455/466 |
| 2006/0172752 A1* | 8/2006 | Harris et al. | ................ | 455/518 |
| 2006/0174020 A1* | 8/2006 | Walls et al. | ................. | 709/230 |

FOREIGN PATENT DOCUMENTS

| | | |
|---|---|---|
| JP | 2003-174520 | 6/2003 |
| JP | 2004-297576 | 10/2004 |

\* cited by examiner

*Primary Examiner*—Daniel J Ryman
*Assistant Examiner*—Thinh D Tran
(74) *Attorney, Agent, or Firm*—DLA Piper LLP (US)

(57) ABSTRACT

A data communication method able to transfer data well in real time group communication between one and many communication terminals, which has a communication server system repeatedly judge whether or not each receiving side communication terminal can communicate, postpone the transfer of data to the communication terminals when it judges there is a communication terminal which cannot communicate, and newly transfer the data postponed in transfer to all of the receiving side communication terminals when subsequently judging that the communication terminal judged to be unable to communicate is able to communicate and a communication server system and a communication terminal used in the same.

25 Claims, 15 Drawing Sheets

DATA COMMUNICATION METHOD, COMMUNICATION SERVER SYSTEM, AND COMMUNICATION TERMINAL

BACKGROUND OF THE INVENTION

1. Field of the Invention

The present invention relates to a method of data communication among mobile phones and other communication terminals, a communication server system for controlling the data communication, and a communication terminal.

2. Description of that Art

In recent years, the forms of communication by mobile phones and other communication terminals have become more diversified. In addition to voice communication by line exchanges, new forms of communication such as packet communication utilizing Internet Protocol (IP) networks have begun to be used. For example, Japanese Patent Publication (A) No. 2003-174520 discloses "chat mail" for real time text conversations between communication terminals. "Chat mail" is one of the forms of communication known as "group communication" where previously registered members form a group and communicate with each other in real time by text and other media data.

One form of group communication attracting attention in recent years is the technique called "Push to Talk Over Cellular (PoC)". In PoC, a plurality of communication terminals form a group is and one communication terminal communicates with many communication terminals" in the group in real time. The sending side communication terminal sends data toward the other plurality of communication terminals in the group, while the receiving side plurality of communication terminals receive the data all together in this form of communication In such real time group communication, communication with each other is possible, but due to the restriction of the bandwidth used, one communication terminal and another communication terminal cannot simultaneously send to each other. For example, when one communication terminal is communicating with the other communication terminal, the other communication terminal can only receive. The other communication terminal cannot send to that communication terminal. The same is true in reverse communication. That is, communication is sometimes carried out by a "half-duplex communication mode".

When engaging in real time group communication such as PoC by the "half-duplex communication mode", however, when a sending side communication terminal sends data to a plurality of the receiving side communication terminals all together, even when one of the receiving side communication terminals is unable to communicate due to degradation of the quality of communication on the reception channel etc. and therefore that communication terminal cannot suitably received the data, since the communication is carried out by the "half-duplex communication mode", that receiving side communication terminal cannot report to the sending side communication terminal it was not able to receive the data normally. As a result, the sending side communication terminal cannot learn of the existence of a communication terminal which cannot receive the data and the sending side communication terminal cannot resend the data to the receiving side communication terminal which cannot normally receive the data, so there is the problem that good group communication is obstructed.

Further, in recent years, as disclosed in Japanese Patent Publication (A) No. 2004-297576, what is being communicated has gone beyond voice and text and now includes still pictures and movies involving large amounts of data. For example, mobile phones mounting cameras and able to transmit images captured by those cameras are known.

When transferring data such as voice, text, and images in real time group communication, the time required until data finishes being received sometimes differs for each user terminal in the group. For example, when mobile phones and other communication terminals communicate wirelessly, the time required until data finishes being received differs for each communication terminal due to the difference of the signal strength and other aspects of the quality of communication. In particular, in the case of data of still pictures and movies involving large amounts of data in comparison with text and voice, this time difference becomes remarkable.

If the time required until data finishes being received differs for each communication terminal, the following disadvantages are liable to occur in group communication of the "half-duplex communication mode" by for example PoC:

(1) When a certain communication terminal (first communication terminal) finishes receiving data, then as a next action transmits new data to a plurality of other communication terminals (second communication terminals), if there is another communication terminal which has not finished receiving the data, the new data transmitted by that first communication terminal will be received in real time at the communication terminals which have finished receiving the previous data among the plurality of second communication terminals, but the communication terminal which has not finished receiving the previous data will end up entering a "Queue state" where it waits for the completion of reception of the previous data. For this reason, a difference ends up occurring in the reception time of new data among the communication terminals. This obstructs good communication.

(2) The first communication terminal sending the data and the second communication terminals ending up finishing receiving the data fast cannot determine at which timing the other receiving side communication terminal will finish receiving the data.

In this way, in real time group communication by the "half-duplex communication mode", since there was a difference of the time required for data to be finished being received among the plurality of the receiving side communication terminals in the group, there was the inconvenience that neither the sending side communication terminal or the receiving side communication terminals could determine the timing when they could send new data as another action even when they finished receiving data.

SUMMARY OF THE INVENTION

An object of the present invention is to provide a method of data communication in real time group communication wherein even if there is a communication terminal with poor reception, even that communication terminal can receive data well.

Another object of the present invention is to provide a data communication device for working that method.

Still another object of the present invention is to provide a communication server system for controlling such data communication and a communication terminal suitable for such data communication.

Further, another object of the present invention is to provide a method of data communication enabling good transfer of data even when there is a difference of time required for data to be finished being received among communication terminals in a group in real time group communication by the "half-duplex communication mode", a communication server system for controlling such data communication, and a communication terminal suitable for such data communication.

According to a first aspect of the present invention, there is provided a data communication method of a half-duplex mode where transmission and reception cannot be simultaneously performed when a first communication terminal and a plurality of second communication terminals communicate with each other via a communication server system, comprising a first step of having the communication server system receive from the first communication terminal the data to be transmitted addressed to the plurality of second communication terminals; a second step of having the communication server system repeatedly judge whether or not each of the plurality of second communication terminals can communicate; a third step of having the communication server system hold the data to be transmitted addressed to the plurality of second communication terminals from the first communication terminal and postpone the transfer to the plurality of second communication terminals when it is judged in the second step that one or more of the plurality of second communication terminals is unable to communicate; a fourth step of having the communication server system transfer the data to be transmitted addressed to the plurality of second communication terminals from the first communication terminal to all of the plurality of second communication terminals when it is judged in the second step that all of the second communication terminals can communicate; and a fifth step of having the communication server system transfer the data for which transfer was postponed to the plurality of second communication terminals when it is judged in the third step that all of the plurality of second communication terminals can communicate by the repeated judgment in the second step after postponing the transfer of the data.

According to a second aspect of the present invention, there is provided a data communication method of a half-duplex mode where transmission and reception cannot be simultaneously performed when a first communication terminal and a plurality of second communication terminals communicate with each other, comprising a first step of having the first communication terminal repeatedly judge whether or not each of the plurality of second communication terminals can communicate; a second step of having the first communication terminal transmit the data to all of the plurality of second communication terminals when it is judged in the first step that all of the plurality of second communication terminals can communicate; a third step of having the first communication terminal hold the data and postpone the transmission when it is judged in the first step that one or more of the plurality of second communication terminals cannot communicate; and a fourth step of having the first communication terminal transmit the data for which transmission was postponed to the plurality of second communication terminals when it is judged in the first step that all of the plurality of second communication terminals can communicate by the repeated judgment after postponing the transmission of the data.

According to a third aspect of the present invention, there is provided a communication server system for controlling data communication when a first communication terminal and a plurality of second communication terminals engage in data communication of a half-duplex mode where transmission and reception cannot be simultaneously performed when they communicate with each other via a communication server system, comprising a receiving means for receiving data to be transmitted addressed to the plurality of second communication terminals from the first communication terminal; a judging means for repeatedly judging whether or not each of the plurality of second communication terminals can communicate; a holding means able to hold the data to be transmitted addressed to the plurality of second communication terminals from the first communication terminal; a transferring means for transferring the data to be transmitted addressed to the plurality of second communication terminals from the first communication terminal to all of the plurality of second communication terminals; and a controlling means for controlling the system so that where it is judged by the judging means that one or more of the plurality of second communication terminals cannot communicate, the data received at that receiving means is held in the holding means, the transfer by the transferring means is postponed, then, when it is judged by the judging means that all of second communication terminals can communicate after postponing that transfer, the data held in the holding means is transferred to all of the plurality of second communication terminals by the transferring means.

According to a fourth aspect of the present invention, there is provided a communication terminal constituting a first communication terminal for transmitting data to second communication terminals when engaging in data communication of a half-duplex mode where transmission and the reception are not simultaneously possible when the first communication terminal and the plurality of second communication terminals communicated with each other, comprising a judging means for repeatedly judging whether or not each of the plurality of second communication terminals can communicate; a holding means able to hold the data to be transmitted to the plurality of communication terminals; a transmitting means for transmitting the data to be transmitted to all of the plurality of second communication terminals; and a controlling means for controlling the system so that, when it is judged by the judging means that one or more of the plurality of second communication terminals cannot communicate, the data is held in the holding means and the transmission of that data by the transmitting means is postponed, then, when it is judged by the judging means that all of the plurality of second communication terminals can communicate after postponing the transmission, the data held in the holding means is transmitted to all of the plurality of second communication terminals by the transferring means.

According to a fifth aspect of the present invention, there is provided a data communication method of a half-duplex mode where transmission and reception cannot be simultaneously performed when a first communication terminal and a plurality of second communication terminals communicate with each other via a communication server system, comprising a first step of having the first communication terminal transmit the data to the plurality of second communication terminals via the communication server system; a second step of having the first communication terminal prohibit new data transmission after it transmits the data; a third step of having each of the plurality of second communication terminals transmit a first notification for notifying the completion of reception to the communication server system when it finishes receiving the data from the first communication terminal and prohibit new data transmission; a fourth step of having the communication server system transmit a second notification for notifying that all of the plurality of second communication terminals finished receiving the data to the first communication terminal and each of the plurality of second communication terminals when the communication server system receives the first notification from all of the plurality of second communication terminals; and a fifth step of having the first communication terminal and the plurality of second communication terminals permit new data transmission when the first communication terminal and the plurality of second communication terminals receive the second notification from the communication server system.

According to a sixth aspect of the present invention, there is provided a data communication method of a half-duplex mode where transmission and reception cannot be simultaneously performed when a first communication terminal and a plurality of second communication terminals communicate with each other, comprising a first step of having the first communication terminal transmit the data to the plurality of second communication terminals; a second step of having the first communication terminal prohibit new data transmission after the first communication terminal transmits the data; a third step of having each of the plurality of second communication terminals transmit a first notification for notifying the completion of reception to the first communication terminal and prohibit new data transmission when each of the plurality of second communication terminals finishes receiving the data from the first communication terminal; a fourth step of having the first communication terminal permit new data transmission and transmit a second notification for notifying that all of the plurality of second communication terminals finished receiving the data when the first communication terminal receives the first notification from all of the plurality of second communication terminals; and a fifth step of having the plurality of second communication terminals permit new data transmission when each of the plurality of second communication terminals receives the second notification from the first communication terminal.

According to a seventh aspect of the present invention, there is provided a communication server system for controlling data communication when a first communication terminal and a plurality of second communication terminals engage in data communication of a half-duplex mode where transmission and reception cannot be performed simultaneously when communicating with each other via a communication server system, comprising a communicating means; a notification reception controlling means for receiving a first notification for notifying the data finishing being received from each of the plurality of the communication terminals via the communicating means; a judging means for judging whether or not all of the plurality of second communication terminals finished receiving the data based on the first notification received at the notification reception controlling means; and a notification transmission controlling means for transmitting a second notification for notifying that all of the plurality of second communication terminals finished receiving the data to the first communication terminal and each of the plurality of second communication terminals via the communicating means when the completion of reception of all of the plurality of second communication terminals is judged in the judging means.

According to an eighth aspect of the present invention, there is provided a communication terminal constituting a first communication terminal when a first communication terminal transmits data to a plurality of second communication terminals in data communication of a half-duplex mode where transmission and reception cannot be performed simultaneously when the first communication terminal and the plurality of second communication terminals communicate with each other, comprising a communicating means; a transmission prohibiting means for prohibiting the transmission of new data from the communicating means after the communicating means has transmitted the data; a notification reception controlling means for receiving a first notification for notifying that data has finished being received transmitted from each of the plurality of second communication terminals via the communicating means; a judging means for judging whether or not all of the plurality of second communication terminals have finished receiving the data based on the first notification received at the notification reception controlling means; a transmission permitting means for permitting the transmission of new data from the communicating means when the completion of reception of all of the plurality of second communication terminals is judged at the judging means; and a notification transmission controlling means for transmitting a second notification for notifying that all of the plurality of communication terminals finished receiving the data to each of the plurality of second communication terminals via the communicating means when the completion of reception of all of the plurality of second communication terminals is judged at the judging means.

According to a ninth aspect of the present invention, there is provided a communication terminal a communication terminal constituting a second communication terminal when a first communication terminal transmits data to a plurality of second communication terminals in data communication of a half-duplex mode where transmission and reception cannot be performed simultaneously when the first communication terminal and the plurality of second communication terminals communicate with each other via a communication server system, comprising a communicating means for transferring data with the communication server system; a judging means for judging whether or not data has finished being received when receiving data transmitted from the first communication terminal; a transmission prohibiting means for prohibiting the transmission of new data from the communicating means when data finishing being received is judged at the judging means; a notification transmission controlling means for transmitting a first notification for notifying the data finishing being received to the communication server system via the communicating means when data finishing being received is judged at the judging means; a notification reception controlling means for receiving a second notification for notifying that all of the plurality of second communication terminals have finished receiving the data from the communication server system via the communicating means after transmitting the first notification; and a transmission permitting means for permitting the transmission of new data from the communicating means when receiving the second notification from the communication server system at the notification reception controlling means.

According to a 10th aspect of the present invention, there is provided a communication terminal constituting a second communication terminal when a first communication terminal transmits data to a plurality of second communication terminals in data communication of a half-duplex mode where transmission and reception cannot be performed simultaneously when the first communication terminal and the plurality of second communication terminals communicate with each other, comprising a communicating means for transferring data with the first communication terminal; a judging means for judging whether or not data has finished being received when receiving data transmitted from the first communication terminal; a transmission prohibiting means for prohibiting the transmission of new data from the communicating means when the data finishing being received is judged at the judging means; a notification transmission controlling means for transmitting a first notification for notifying the completion of the reception of the data to the first communication terminal via the communicating means when the data finishing being received is judged at the judging means; a notification reception controlling means for receiving a second notification for notifying that the data has finished being received in all of the plurality of second communication terminals from the first communication terminal via the communicating means after transmitting the first notification; and a transmission permitting means for permitting the transmission of new data from the communicating means when receiving the second notification from the first communication terminal at the notification reception controlling means.

According to the first to fourth aspects of the present invention, even if there is a second communication terminal which temporarily becomes unable to communicate when a first communication terminal is transmitting data to a plurality of second communication terminals, the data is transmitted to that communication terminal after that communication terminal is restored to the communication state, therefore data communication can be carried out without loss.

According to the fifth to 10th aspects of the present invention, in real time group communication by the "half-duplex communication mode", even when there is a difference of time required for data to finish being received among the communication terminals in the group, each communication terminal can learn the suitable timing of transmission of the data, therefore data can be transferred well.

BRIEF DESCRIPTION OF THE DRAWINGS

The above characteristic features and effects of the present invention and other characteristic features and effects will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

First Embodiment

Figure 1:
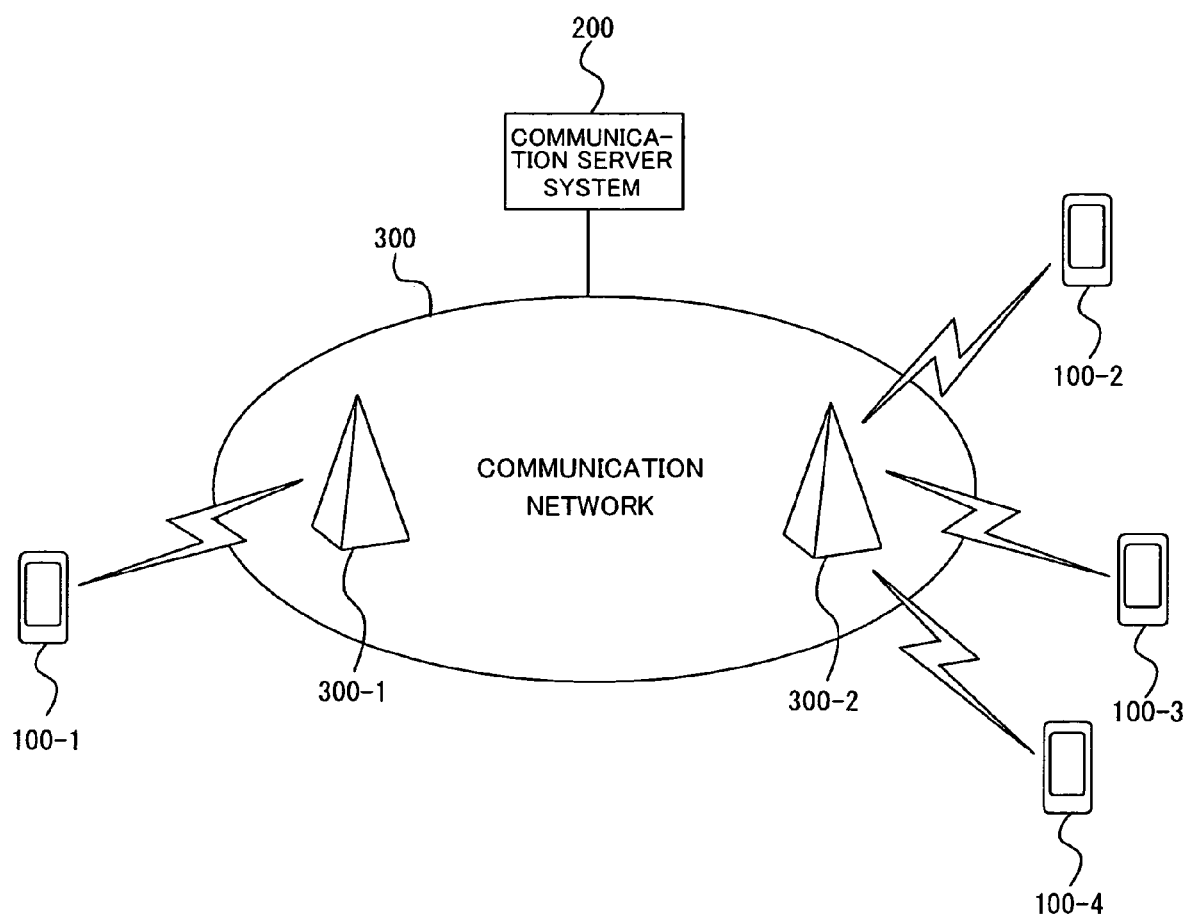
FIG. 1 is a diagram showing an example of the configuration of a communication system according to a first embodiment of the present invention.

FIG. 1 is a diagram showing an example of the configuration of a communication system according to a first embodiment of the present invention. The communication system shown in FIG. 1 has a communication network 300, a plurality of communication terminals 100-1 to 100-4 connected to this communication network 300, a communication server system 200, and two base stations 300-1 and 300-2. "Group communication" for communication from one communication terminal to a plurality of communication terminals via the communication server system 200 will be explained in the first embodiment.

Each of the plurality of communication terminals 100-1 to 100-4 is for example a mobile phone or other wireless communication terminal connected to the communication network 300 via nearby base stations 300-1 and 300-2. The communication terminals 100-1 to 100-4 perform data communication under the control of the communication server system 200 connected to the communication network 300. In the present embodiment, it is assumed that data communication of the "half-duplex mode" by PoC is carried out as an example. The data communication of the "half-duplex mode" means that two communication terminals can mutually communicate, but due to the restriction of the bandwidth used, one communication terminal and the other communication terminal cannot simultaneously transmit, so, for example, when one communication terminal transmits to the other communication terminal, the other communication terminal can only receive, that is, the other communication terminal cannot transmit to one communication terminal, or the reverse. The data transmitted in the data communication includes for example voice in speech, image, and text.

Each of the plurality of communication terminals 100-1 to 100-4 sends a predetermined response to the communication server system 200 when the communication server system 200 sends a signal for checking whether or not communication is possible by a "ping (packet internet groper)" command or the like during the period of the data communication by PoC. As such a response, for example a signal indicating a state where the communication is possible or a signal indicating a state where the communication is not possible is transmitted.

The communication server system 200 is a system for controlling group communication by PoC of the plurality of communication terminals 100-1 to 100-4. When receiving a request of start of group communication by PoC from one of the plurality of communication terminals 100-1 to 100-4, the communication server system 200 calls up the plurality of communication terminals of the other parties in response to the request and establishes a communication session. After the establishment of the communication session, the communication server system 200 relays the data to be transmitted from that one communication terminal to the plurality of other communication terminals. Namely, the communication server system 200 receives the data transmitted addressed to the receiving side communication terminals from the sending side communication terminal once and transfers this to the receiving side communication terminals.

The communication server system 200 repeatedly judges whether or not each communication terminal can communicate in the period of the group communication. For example, the communication server system 200 periodically sends "ping command" to the receiving side communication terminals and checks the response to judge whether or not the receiving side communication terminals are in the communication state. When it judges by this judgment that all of the receiving side communication terminals are able to communicate, the communication server system 200 transfers the data sent from the sending side communication terminal to each receiving side communication terminal.

When judging by this judgment that there is a communication terminal unable to communicate, the communication server system 200 postpones the transfer of the data to all of the receiving side communication terminals and temporarily holds the data sent from the sending side communication terminal. When it subsequently newly judges that the communication terminal judged unable to communicate can communicate by the repeated judgment explained above, the communication server system 200 transmits the data for which transfer is being postponed to all of the receiving side communication terminals.

The communication server system 200 suitably discards the data for which transfer is being postponed according to predetermined conditions. The predetermined conditions are for example a case where a postponement time exceeds a predetermined time, a case where the data for which transfer is being postponed becomes excessive, and other cases. For example, the communication server system 200 discards data for which the postponement time has exceeded a predetermined time in the data for which transfer is being postponed. Alternatively, the communication server system 200 discards data exceeding a predetermined amount of data and the oldest in timing of postponement of transfer. Alternatively, the communication server system 200 discards the entire excessive amount of data from the predetermined amount of data in data for which transfer is being postponed, for example, the data having a postponement time exceeding a predetermined time in the data for which transfer is being postponed. Due to this, it becomes possible to restrict the amount of data held in the communication server system 200 due to the postponing of the data transfer.

Figure 2:
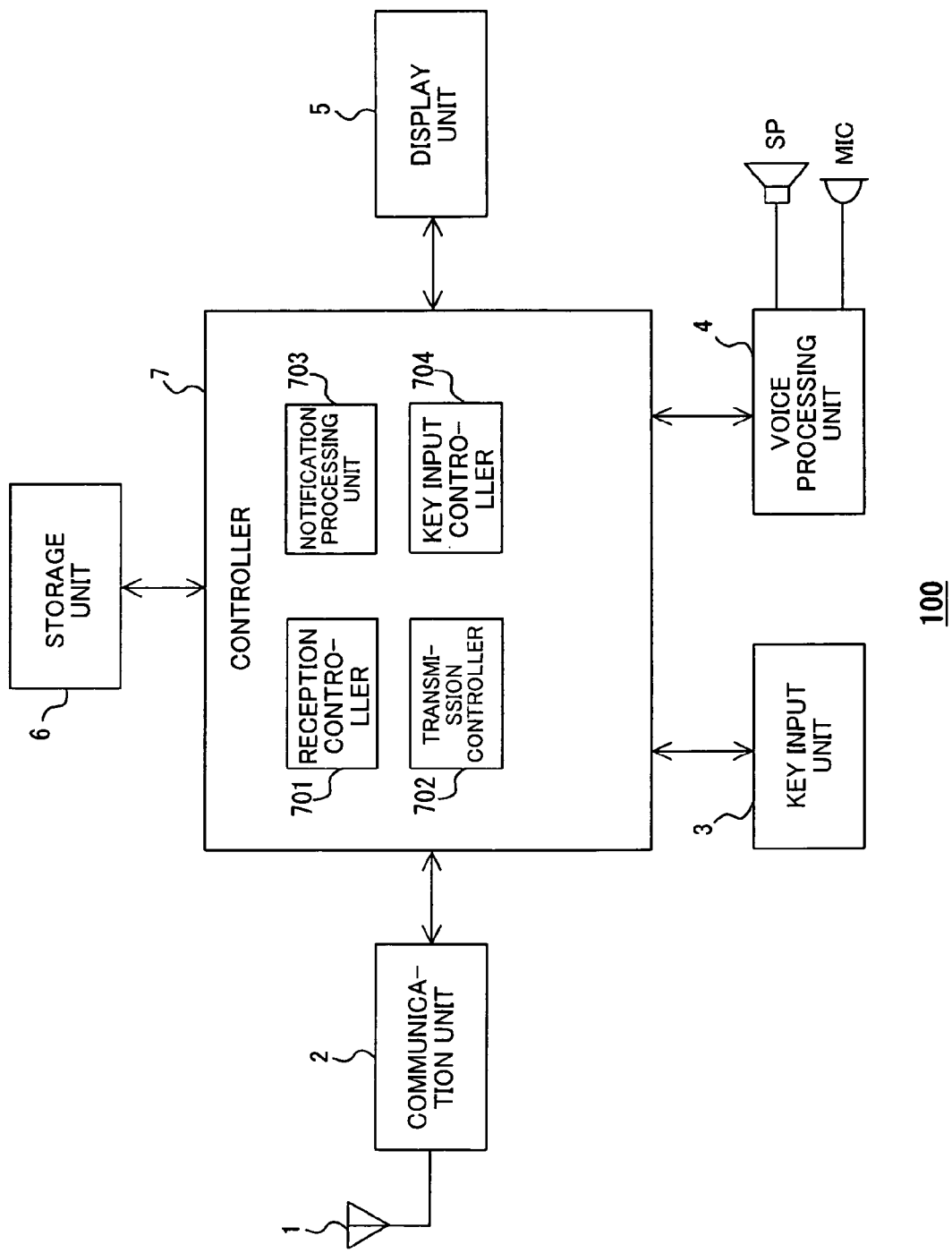
FIG. 2 is a diagram showing an example of the configuration of a communication terminal illustrated in FIG. 1.

The configuration of the communication terminals 100-1 to 100-4 will be explained next with reference to FIG. 2. In the present embodiment, the plurality of communication terminals 100-1 to 100-4 have the same components as the terminal exemplified in FIG. 2. The communication terminal shown in FIG. 2 has an antenna 1, a communication unit 2, a key input unit 3, a voice processing unit 4, a display unit 5, a storage unit 6, and a controller 7.

The communication unit 2 performs processing for wireless communication with the base stations 300-1 and 300-2 of the communication network 300. For example, it applies predetermined modulation processing to the transmission data supplied from the controller 7 to convert it to a wireless signal and transmits the same from the antenna 1. Further, it applies predetermined demodulation processing to the wireless signal from the base station received at the antenna 1 to convert it to the reception data and outputs the same to the controller 7.

The key input unit 3 has keys having various types of functions, for example number keys, letter/character keys, arrow keys, and an execute key. When these keys are operated by a user of the communication terminal, it converts the operation content to an electric signal and notifies the same to the controller 7. The key input unit 3 is provided with a key for transmission and reception (send key) in group communication by PoC. By the user operating the send key, the communication terminal is switched to a transmission terminal or a reception terminal.

The voice processing unit 4 processes a voice signal input/output at a speaker and a microphone. Namely, the voice processing unit 4 amplifies the voice signal input from a microphone MIC, converts the amplified voice signal to a digital signal, applies signal processing such as encoding to the signal converted to the digital signal, and outputs the same to the controller 7. Further, the voice processing unit 4 decodes the voice data supplied from the controller 7, converts the digital decoded voice signal to an analog signal, applies signal processing such as amplification, and outputs the same to a speaker SP.

The display unit 5 is configured by using a liquid crystal display panel, an organic EL panel, or other display device and displays an image in accordance with image data supplied from the controller 7. For example, it displays a phone number of the called party at the time of transmission, the phone number of the calling party at the time of reception, contents of the received mail and the sent mail, a standby screen, date, time, remaining battery power, etc.

The storage unit 6 stores various types of data utilized in the processing of the controller 7 and the data of the result of processing by the controller 7. For example, the storage unit 6 stores a computer program run at the controller 7, constant data used for the processing, variable data temporarily stored in the processing step, and an address book for managing information such as phone numbers and e-mail addresses.

The controller 7 performs various processing concerning the overall operation of the communication terminal. For example, as the processing concerning voice, the controller 7 controls the input/output of speech in the voice processing unit 4 and the transmission/reception of voice data in the communication unit 2 so that voice communication is suitably carried out according to a predetermined protocol. Further, as the processing concerning e-mail, the controller 7 controls the input of the text data from the key input unit 3, the display of the sent/received mail at the display unit 5, and the transmission/reception of e-mail in the communication unit 2 for suitable preparation of sent mail, viewing of received mail, and transmission/reception of e-mail.

The controller 7 has for example a computer for executing processing based on programs (operating system, application program, etc.) stored in the storage unit 6. It executes the processing explained above and the processing explained below according to the programs. In other words, the application program stored in the storage unit 6 and run on the computer is produced so as to perform the processing of the controller 7 explained above and the processing of the controller 7 explained below.

The configuration of the controller 7 shown in FIG. 2 will be explained next. A reception controller 701 and a transmission controller 702 control the operation concerning the transmission/reception of the data in data communication of the half-duplex communication mode by PoC. The notification processing unit 703 processes a notification sent from the communication server system 200. For example, when a predetermined signal for confirming the communication state, for example, a ping command, is sent from the communication server system 200, the notification processing unit 703 transmits a predetermined response signal to the communication server system 200. Further, when receiving a notification indicating that data which has not been transferred is held in the communication server system 200, the notification processing unit 703 requests invalidation of the send key to the key input controller 704 and prohibits the communication terminal from becoming the sending side. In this case, the notification processing unit 703 can make the display 5 also display text and an image for notifying the invalidation of the data transmission.

The key input controller 704 makes the input of the send key of the key input unit 3 valid or invalid according to the request of the notification processing unit 703. When the input of the send key is made invalid, the communication terminal is prohibited from becoming the transmission terminal and becomes unable to send data even when the user operates the send key.

Figure 3:
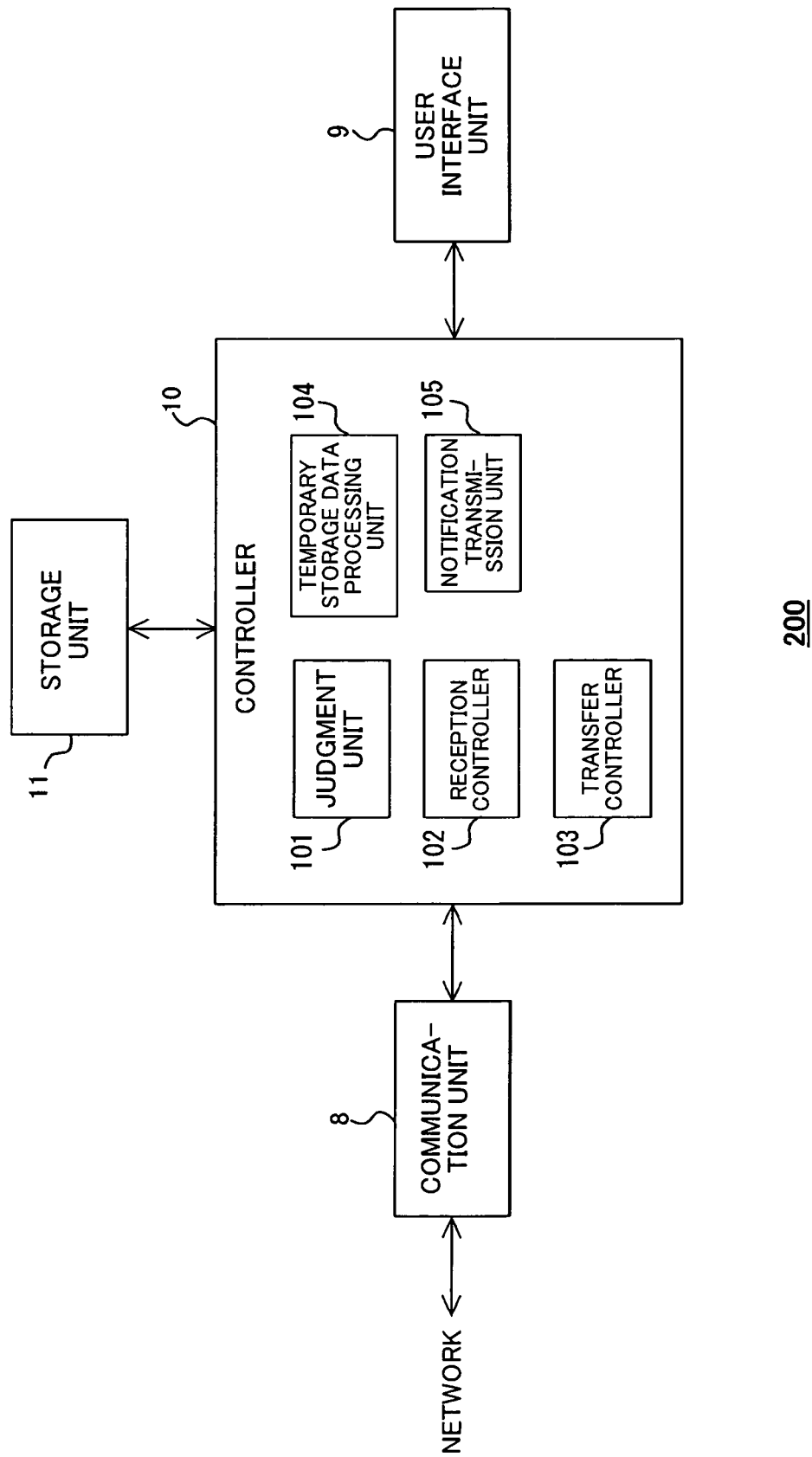
FIG. 3 is a diagram showing an example of the configuration of a communication server system illustrated in FIG. 1.

The configuration of the communication server system 200 will be explained with reference to FIG. 3. The communication server system 200 shown in FIG. 3 has a communication unit 8, a user interface unit 9, a controller 10, and a storage unit 11.

The communication unit 8 performs processing concerning communication via the communication network 300. For example, for group communication by PoC, the communication server system 200 is connected to the IP network. The communication unit 8 performs the processing concerning the transmission/reception of the data via this IP network.

The user interface unit 9 is for example a keyboard, mouse, or display device for input/output of information for operating the communication server system 200.

The storage unit 11 stores various types of data utilized in the processing of the controller 10 and the data of the result of processing of the controller 10. For example, it stores the computer programs run in the controller 10, constant data used for the processing, variable data temporarily stored in the processing step, etc. Further, the storage unit 11 temporarily holds the data postponed in transfer by the controller 10.

The controller 10 performs various processing concerning the overall operation of the communication server system 200. For example, the controller 10 calls up the communication terminals of the other parties and performs the processing for establishing a communication session when one communication terminal requests the start of group communication. Further, the controller 10 receives the data transmitted addressed to a plurality of communication terminals from one communication terminal after the establishment of the communication session once and suitably transfers this to the receiving side communication terminals. The controller 10 has for example a computer for executing the processing based on the programs (operating system, application program, etc.) stored in the storage unit 11 and executes the processing according to the application program. In other words, the application program stored in the storage unit 11 and run in the computer is produced so as to perform the processing of the controller 10 explained above and the processing of the controller 10 explained later.

The controller 10 is used in group communication by PoC, therefore has a judgment unit 101, reception controller 102, transfer controller 103, temporary storage data processing unit 104, and notification transmission unit 105.

The judgment unit 101 repeatedly judges whether or not each communication terminal participating in data communication by PoC can communicate. For example, the judgment unit 101 periodically transmits a signal for confirming the connection state to each receiving side communication terminal by a ping command etc. and judges whether or not each communication terminal can communicate in accordance with whether or not a response signal with respect to this is returned back.

The reception controller 101 and the transfer controller 103 control operations concerning the reception and the transfer of the data in the half-duplex data communication by PoC. The reception controller 101 receives the data transmitted from the sending side communication terminal by group communication.

The transfer controller 103 transfers the data received at the reception controller 101 to all of the receiving side communication terminals when it is judged in the judgment unit 101 that all of the receiving side communication terminals can communicate. On the other hand, when it is judged in the judgment unit 101 that one or more communication terminals cannot communicate, the transfer controller 101 postpones the transfer of the data to any communication terminal judged unable to communicate and temporarily stores the data sent from the sending side communication terminal in a predetermined storage area of the storage unit 11. When it is judged by the repeated judgment of the judgment unit 101 after this postponing of transfer that the communication terminal judged unable to communicate can now communicate, the data postponed in transfer is transferred to the receiving side communication terminal. For example, the transfer controller 103 postpones the transfer of the data to all of the receiving side communication terminals when even one receiving side communication terminal is judged unable to communicate. In this case, when it is judged by subsequent judgment of the judgment unit 101 that all of the receiving side communication terminals can communicate, the transfer controller 10 transfers the data temporarily stored in the storage unit 11 due to the postponing of the transfer to all of the receiving side communication terminals.

The temporary storage data processing unit 104 discards the data temporarily stored in the storage unit 11 due to the postponing of the transfer under predetermined conditions. For example, the temporary storage data processing unit 104 discards the data having a postponement time exceeding a predetermined time in data for which transfer is postponed. Alternatively, the temporary storage data processing unit 104 discards data exceeding a predetermined amount of data and the oldest in timing of postponement of transfer in data for which transfer is postponed.

The communication transmission unit 105 performs the processing for transmitting a notification to each communication terminal. For example, the notification transmission unit 105 transmits a signal for notifying whether or not untransferred data remains in the storage unit 11 to the communication terminals on the sending side and the receiving side.

Figure 4:
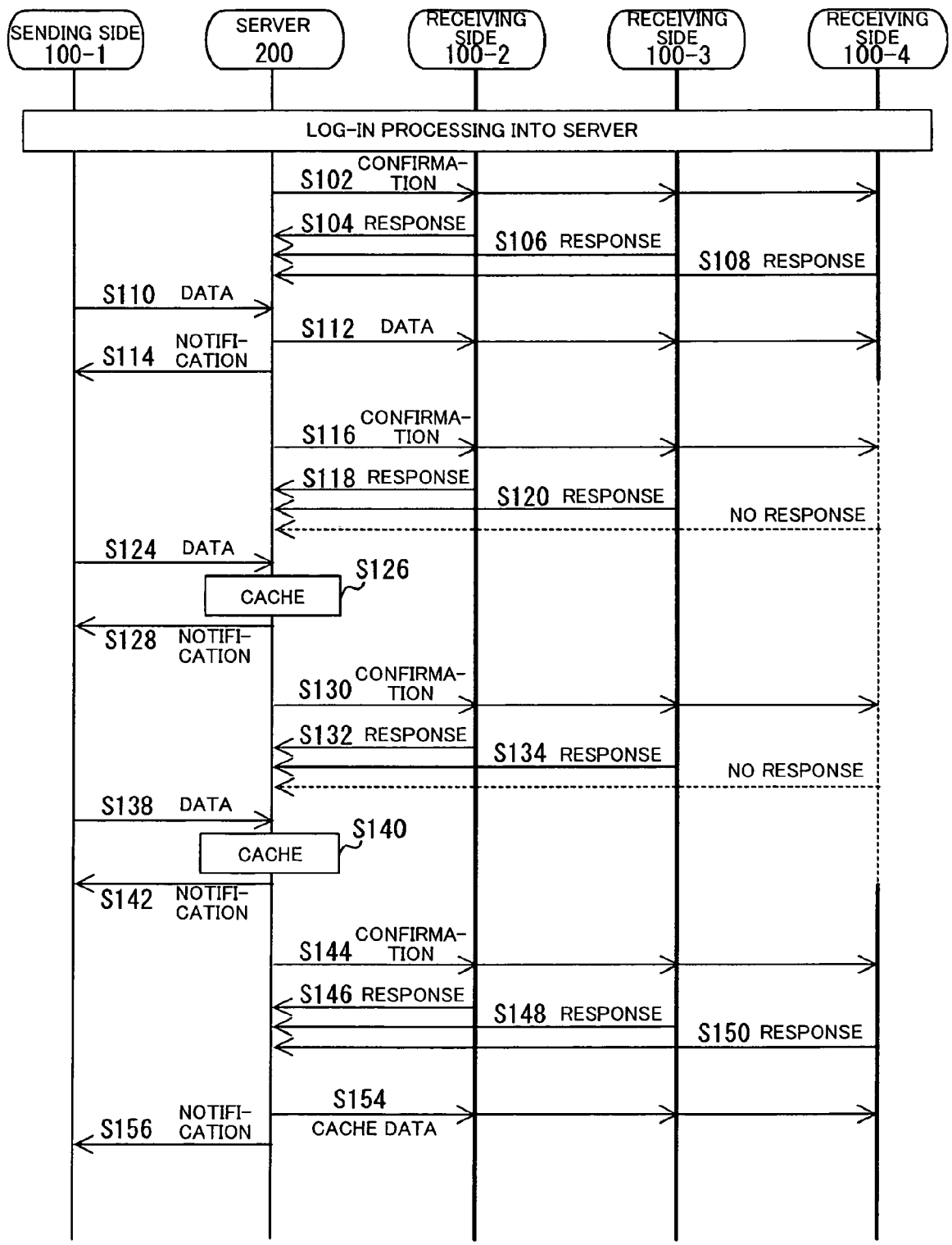
FIG. 4 is a flow chart showing an example of a data communication routine in the communication system according to the first embodiment.

The operation of the communication system according to the present embodiment will be explained next with reference to FIG. 4. FIG. 4 is a flow chart showing a first example of a data communication routine in the communication system according to the present embodiment. In the example of FIG. 4, the communication terminal 100-1 becomes the sending side, that is, the first communication terminal of the present invention, and the plurality of communication terminals 100-2 to 100-4 become the receiving side, that is, the second communication terminals of the present invention, for voice communication.

Log-In Processing to Server and Establishment of Communication Session

The sending side communication terminal 100-1 logs into the communication server system 200 and requests the callup of the communication terminals of the other parties. The communication server system 200 calls up the communication terminals of the other parties which become the receiving side in response to this request and establishes the communication session. The routine up to this point constitutes the log-in processing to the server.

Confirmation of Connection States of Receiving Side Communication Terminals

When the communication session is established, the communication server system 200 periodically transmits a signal for confirming the connection state (ping command etc.) to the plurality of receiving side communication terminals 100-2 to 100-4 (steps S102, S116, S130, S144).

At a point of time for confirmation of step S102, all of the communication terminals 100-2 to 100-4 are in the communication state, therefore the receiving side communication terminals 100-2 to 100-4 return response signals to the communication server system 200 (steps S104, S106, and S108). The communication server system 200 receiving these response signals judges that all receiving side communication terminals 100-2 to 100-4 can communicate. In this case, the communication server system 200 transfers the data transmitted from the sending side communication terminal 100-1 (step S110) to all receiving side communication terminals 100-2 to 100-4 (step S112). At this time, the communication server system 200 does not hold untransferred data, therefore the communication server system 200 transmits signals for notifying this fact to the sending side communication terminal 100-1 and all receiving side communication terminals 100-2 to 100-4. The sending side communication terminal 100-1 is sent just this notification indicating that "untransferred data is not held" (S114), while the receiving side communication terminals 100-2 to 100-4 are sent notifications indicating that "untransferred data is not held" added to for example the data of step S110. The receiving side communication terminals 100-2 to 100-4 receiving notifications indicating that "untransferred data is not held" make operations of the send keys valid. Namely, the communication terminals 100-2 to 100-4 in this case can switch from the receiving side to the sending side in response to operations of send keys at this point of time.

In this way, when all receiving side communication terminals 100-2 to 100-4 can communicate, the data transmitted from the sending side communication terminal 100-1 to the communication server system 200 is transferred to all receiving side communication terminals 100-2 to 100-4.

On the other hand, for example, assume the communication terminal 100-4 is unable to communicate at the point of time of the confirmations of steps S116 and S130. Therefore, response signals (S18, S132) from the communication terminal 100-2 and response signals (S120, S134) from the communication terminal 100-3 are returned to the communication server system 200, but the response signal from the communication terminal 100-4 is not returned to the communication server system 200. As a result of this, the communication server system 200 judges that the communication terminal 100-4 cannot communicate. In this case, the communication server system 200 does not transfer the data transmitted from the sending side communication terminal 100-1 (steps S124, S138) to the receiving side communication terminals 100-2 to 100-4, but temporarily stores the same in the storage unit 11 (steps S126, S140). Due to this, the storage unit 11 of the communication server system 200 holds the untransferred data, therefore the communication server system 200 transmits signals notifying this fact to the sending side communication terminal 100-1 (S128, S142).

Thereafter, when the communication terminal 100-4 can again communicate at the point of time of the confirmation of step S144, receiving side communication terminals 100-2 to 100-4 return response signals (steps S146, S148, S150). The communication server system 200 receiving these response signals judges that all receiving side communication terminals 100-2 to 100-4 can communicate again. As a result, the communication server system 200 transfers the data for which transfer is being postponed temporarily stored in the storage unit 11 to all receiving side communication terminals 100-2 to 100-4 (S154).

When there is still untransferred data remaining in the storage unit 11 of the communication server system 200 even after this data transfer, the controller 10 of the communication server system 200 transmits signals notifying this fact to the sending side communication terminal 100-1 and the receiving side communication terminals 100-2 to 100-4. The receiving side communication terminals 100-2 to 100-4 receiving these notifications make their send keys invalid. Namely, the receiving side communication terminals 100-2 to 100-4 are prohibited from switching to the sending side even when their send keys are operated. This prohibition state is lifted when there is no longer any untransferred data remaining in the communication server system 200 and a signal notifying this fact is transmitted from the communication server system 200 to the communication terminals.

According to the first embodiment of the present invention, the communication server system 200 repeatedly judges whether any of the receiving side communication terminals is unable to communicate. When judging that any of the receiving side communication terminals is unable to communicate, it postpones the transfer of the data to all of the receiving side communication terminals. Then, when subsequently judging that the communication terminal judged to be unable to communicate is able to communicate, it newly transfers the data postponed in transfer to all of the receiving side communication terminals. Due to this, when one communication terminal (first communication terminal of the present invention) transmits data to a plurality of communication terminals (second communication terminals of the present invention) in PoC or other group communication, if there is any receiving side communication terminal which temporarily becomes unable to communicate, it does not transfer the data to any of the receiving side communication terminals. It transfers the data to all of the receiving side communication terminals all together when all of the receiving side communication terminals recover in communication states. Therefore, data can be communicated from one communication terminal to a large number of communication terminals ("one communication terminal:many communication terminals") well without any delay of data reception among the receiving side communication terminals. The same storage area provided in the storage unit 11 of the communication server system 200 for temporarily storing the data for which transfer is being postponed can be shared by the plurality of the receiving side communication terminals, therefore the capacity of the storage area of the storage unit 11 can be made smaller.

In the first embodiment, whether or not the communication server system 200 holds untransferred data is notified to the sending side communication terminal 100-1 and the receiving side communication terminals 100-2 to 100-4. Due to this, the sending side communication terminal 100-1 and the receiving side communication terminals 100-2 to 100-4 can correctly determine the existence of any untransferred data held in the communication server system 200. In particular, when the receiving side communication terminals 100-2 to 100-4 learn that there is untransferred data remaining in the communication server system 200 by this notification, they can prohibit data transmission so as to avoid the situation of the sequence of reception ending up changing when the receiving side communication terminals 100-2 to 100-4 receive consecutive data. For example, the situation where one communication terminal becomes the sending side and sends words, but old speech remaining in the communication server system 200 before it became the sending side being heard can be prevented.

In the first embodiment, the data for which transfer is being postponed held in the communication server system 200 is suitably discarded according to predetermined conditions. For example, the data with a postponement time of transfer exceeding a predetermined time or the data exceeding a predetermined amount of data and the oldest in timing of postponement of transfer are discarded. Due to this, it becomes possible to restrict the amount of the data held in the communication server system 200 due to the postponing of the data transfer, so the storage capacity need not be made wastefully large. Further, since the data oldest in time of postponement of transfer is sequentially discarded, when the temporarily stored data disappears, it becomes possible to connect the data transmitted in real time after that without interruption and transmit the same to the receiving side communication terminals. Due to this, the receiving side communication terminals can treat the data being received at present as if it were data transmitted in real time, therefore voice and other communication for which a real time property is required can be carried out well.

Second Embodiment

Figure 5:
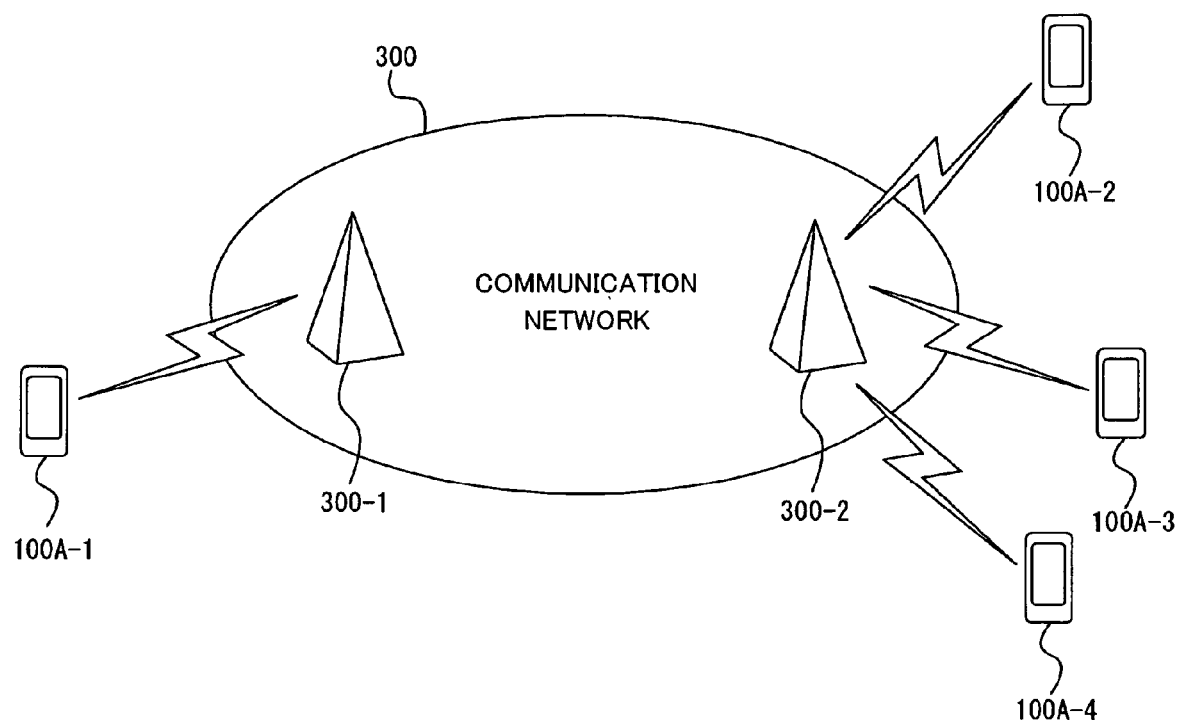
FIG. 5 is a diagram showing an example of the configuration of the communication system according to a second embodiment of the present invention.

A second embodiment of the present invention will be explained next. FIG. 5 is a diagram showing an example of the configuration of the communication system according to the present embodiment. In the first embodiment, data was communicated via a communication server system, but in the second embodiment, the data is directly communicated between the communication terminals without going through a communication server system. As shown in FIG. 5, in the second embodiment, a plurality of communication terminals 100A-1 to 100A-4 directly engage in "P2P (peer-to-peer)" data communication via a communication network 300.

Figure 6:
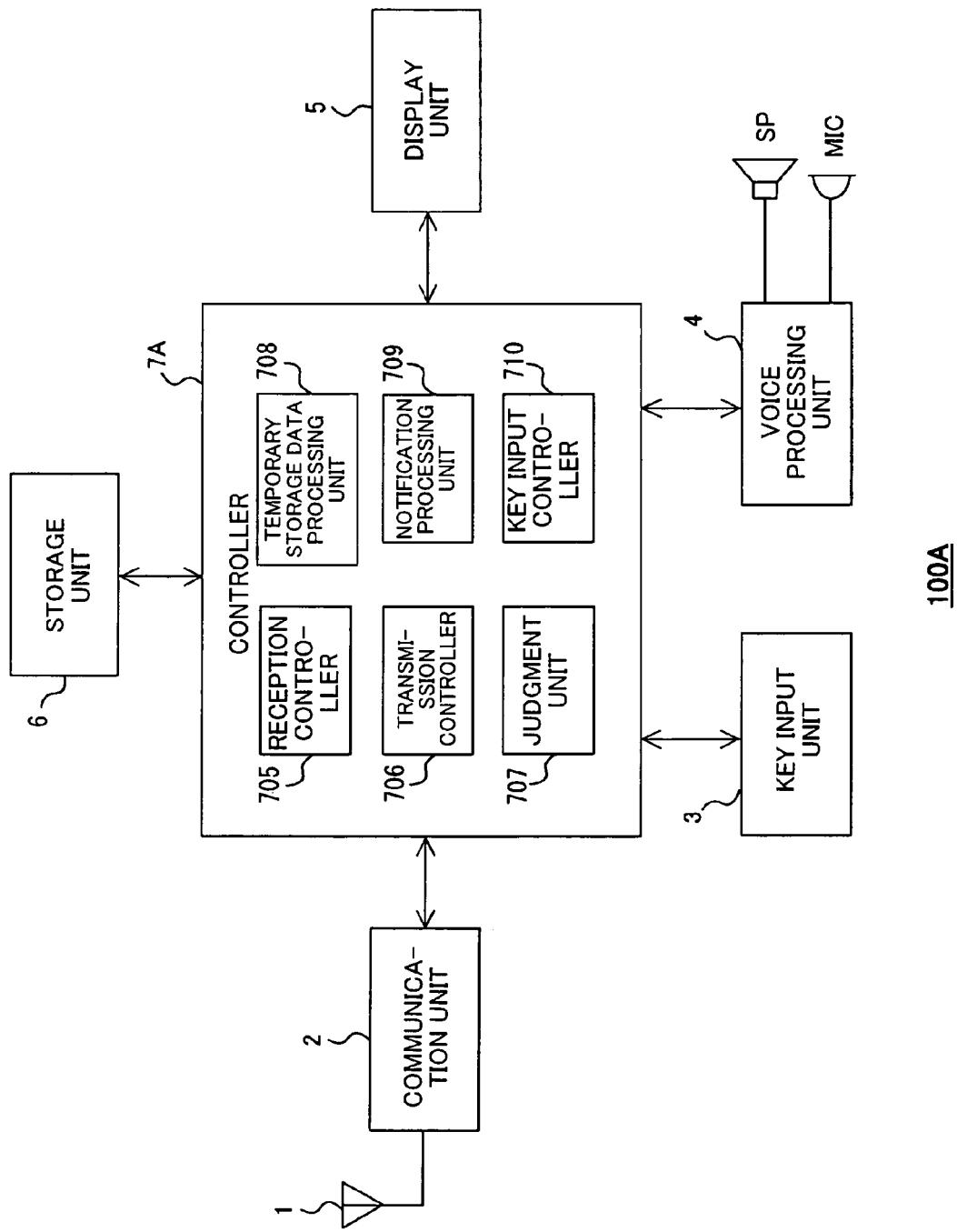
FIG. 6 is a diagram showing an example of the configuration of the communication terminal illustrated in FIG. 5.

FIG. 6 is a diagram showing an example of the configuration of the communication terminal in the second embodiment. The same notations in FIG. 2 and FIG. 6 indicate the same components. The communication terminal shown in FIG. 6 has a controller 7A replacing the controller 7 in the communication terminal shown in FIG. 2, or having the functions described in the second embodiment to the controller 7. The rest of the components are the same as those of the communication terminal shown in FIG. 2.

The controller 7A performs various processing concerning the overall operation of the communication terminal. The controller 7A has for example a computer for executing processing based on the programs stored in the storage unit 6 and executes the processing according to the programs. The controller 7A has a reception controller 705, transmission controller 706, judgment unit 707, temporary storage data processing unit 708, notification processing unit 709, and key input controller 710 for processing concerning group communication by PoC.

The judgment unit 707 is a processing block operating when the communication terminal becomes the sending side and repeatedly judges whether or not each communication terminal participating in the data communication by PoC can communicate. For example, it periodically transmits a signal for confirming the connection state by a ping command etc. to the receiving side communication terminals and judges whether or not each communication terminal can communicate in accordance with whether or not a response signal with respect to this is returned.

The reception controller 705 receives the data sent from the communication terminal of another party in the group communication.

The transmission controller 706 transmits data to all of the receiving side communication terminals when the judgment unit 707 judges that all of the receiving side communication terminals can communicate. On the other hand, when the judgment unit 707 judges that one or more communication terminals cannot communicate, the transmission controller 706 postpones the transmission of the data to all of the receiving side communication terminals and temporarily stores the data postponed in transfer in the predetermined storage area of the storage unit 6. Then, when the judgment unit 707 subsequently judges by the repeated judgment that the communication terminal judged to be unable to communicate is able to communicate after this postponing of transmission, the transmission controller 705 transfers the data postponed in transmission to all of the receiving side communication terminals. For example, the transmission controller 706 postpones the transmission of the data to all of the receiving side communication terminals when judging that even one receiving side communication terminal is unable to communicate. In this case, the transmission controller 706 transmits the data temporarily stored in the storage unit 6 due to the postponing of transmission to all of the receiving side communication terminals when the judgment unit 707 subsequently judges that all of the receiving side communication terminals can communicate.

The temporary storage data processing unit 708 discards the data temporarily stored in the storage unit 6 due to the postponing of the transmission based on predetermined conditions. For example, it discards data with a postponement time exceeding a predetermined time in the data for which transmission is being postponed. Alternatively, it discards data exceeding a predetermined amount of data and the oldest in timing of postponement of transmission in the data for which transmission is being postponed.

The notification processing unit 709 transmits a predetermined notification to the receiving side communication terminals in the case where the communication terminal operates as the sending side. For example, it transmits a signal for notifying whether there is data which is not transmitted remaining in the storage unit 6 to each of the receiving side communication terminals. The notification processing unit 709 processes the notifications and commands sent from a sending side communication terminal when the communication terminal operates as the receiving side. For example, when a sending side communication terminal sends a predetermine signal (ping command etc.) for confirming the communication state, the notification processing unit 709 transmits a predetermined response signal to this sending side communication terminal. When receiving a notification that there is data which is not transmitted held in the sending side communication terminal, the notification processing unit 709 requests the invalidity of the send key to the key input controller 710 and prohibits the communication terminal operating as the sending side. In this case, the notification processing unit 709 can make the display device 5 display text and an image for notifying the invalidity of the data transmission.

The key input controller 710 makes the send key of the key input unit 3 valid or invalid according to the request of the notification processing unit 709. When making the send key invalid, the communication terminal is prohibited from operating as the sending side and can no longer send data.

Figure 7:
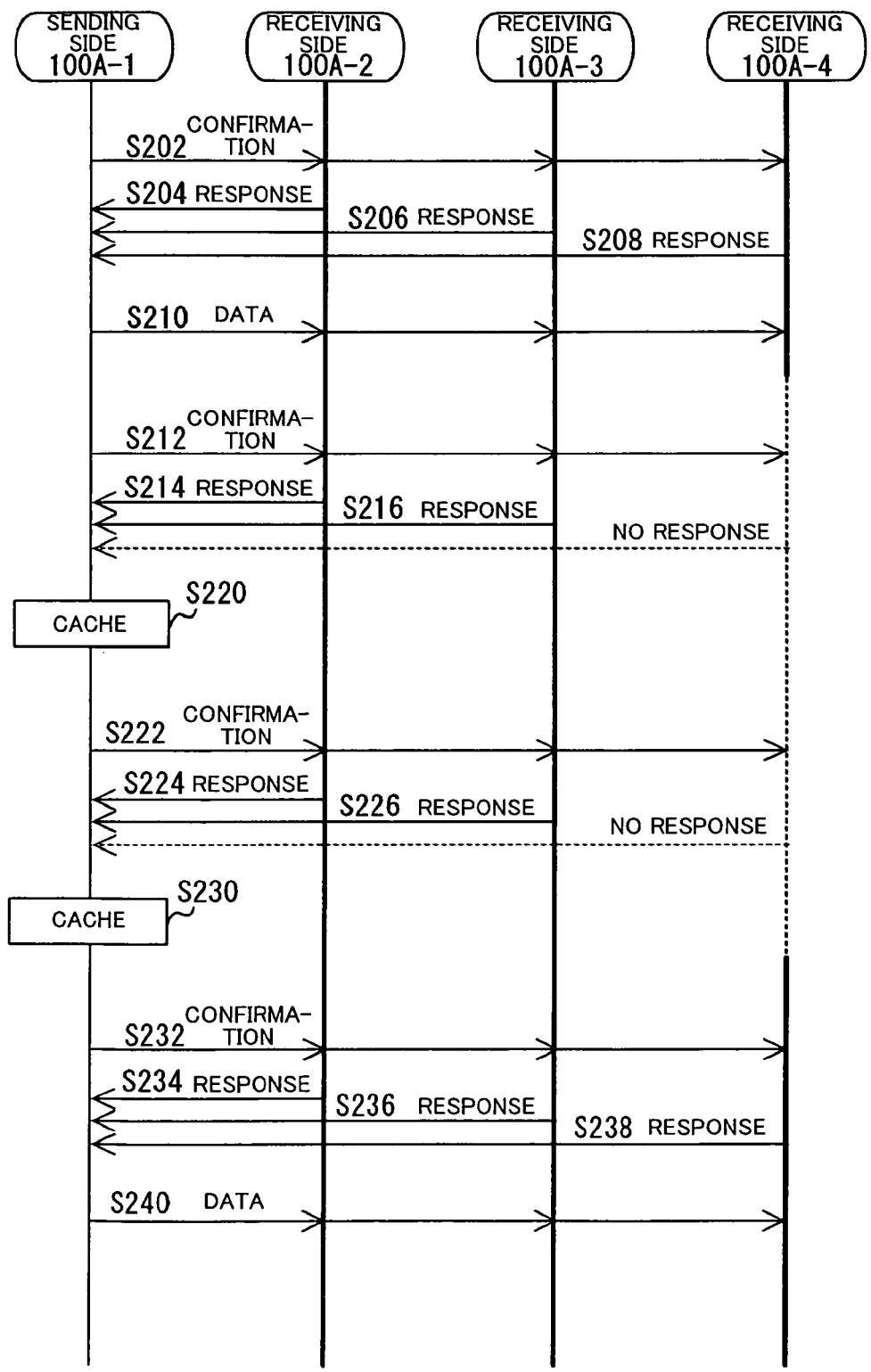
FIG. 7 is a flow chart showing an example of a data communication routine in the communication system according to the second embodiment.

The operation of the second embodiment will be explained next with reference to FIG. 7. FIG. 7 is a flow chart showing a first example of the data communication routine in the communication system according to the present embodiment. In the example of FIG. 7, the communication terminal 100A-1 operates as the sending side, and the communication terminals 100A-2 to 100A-4 operate as receiving side for voice communication.

The sending side communication terminal 100A-1 periodically transmits a signal for confirming the connection state, for example, a ping command, to the receiving side communication terminals 100A-2 to 100A-4 (steps S202, S212, S222, S232).

At the point of time of the confirmation of step S202, all of the receiving side communication terminals 100A-2 to 100A-4 can communicate, therefore the receiving side communication terminals 100A-2 to 100A-4 return response signals to the sending side communication terminal 100A-1 (steps S204, S206, S208). The communication terminal 100A-1 receiving these response signals judges that all of the receiving side communication terminals 100A-2 to 100A-4 can communicate. As a result, the communication terminal 100A-1 transmits voice communication and other data to all of the receiving side communication terminals 100A-2 to 100A-4 (step S210).

At this time, the communication terminal 100A-1 does not hold any the untransmitted data, therefore the communication terminal 100A-1 transmits a signal notifying this fact to the receiving side communication terminals 100A-2 to 100A-4. This notification signal is transmitted while being added to for example the data of step S210. The receiving side communication terminals 100A-2 to 100A-4 receiving this notification validate operations of their send keys. Namely, the communication terminals 100A-2 to 100A-4 in this case can switch from the receiving side to the sending side in response to operations of their send keys.

In this way, when all of the receiving side communication terminals 100A-2 to 100A-4 can communicate, the sending side communication terminal 100A-1 sends the data to all of the receiving side communication terminals 100A-2 to 100A-4.

Assume that for example the communication terminal 100A-4 cannot communicate at the point of time of the confirmations of steps S212 and S2221. In this case, response signals from the communication terminal 100A-2 (S214, S224) and response signals from the communication terminal 100A-3 (S216, S226) are returned to the sending side communication terminal 100A-1, but no response signals from the communication terminal 100A-4 are returned to the sending side communication terminal 100A-1. For this reason, the communication terminal 100A-1 judges that the communication terminal 100A-4 is unable to communicate. In this case, the communication terminal 100A-1 does not transmit the data to any of the receiving side communication terminals 100A-2 to 100A-4, but temporarily stores the same in the storage unit 6 (steps S220, S230).

Thereafter, when the communication terminal 100A-4 is able to communicate again at the point of time of the confirmation of step S232, the response signals are returned from all of the receiving side communication terminals 100A-2 to 100A-4 (steps S234, S236, S238). The communication terminal 100A-1 receiving these response signals judges that all of the receiving side communication terminals 100A-2 to 100A-4 can communicate again. In this case, the communication terminal 100A-1 transmits the data for which transmission is being postponed temporarily stored in the storage unit 6 to all of the receiving side communication terminals 100A-2 to 100A-4 (step S240).

When there is untransferred data remaining in the communication server system 200 even after this data transmission, the communication terminal 100A-1 transmits signals notifying this fact to the receiving side communication terminals 100A-2 to 100A-4. The receiving side communication terminals 100A-2 to 100A-4 receiving these notifications make their send keys invalid. Namely, the receiving side communication terminals 100A-2 to 100A-4 are prohibited from switching to the sending side irrespective of operations of their send keys. This prohibition state is lifted when there is no longer any untransmitted data remaining in the communication terminal 100A-1 and a signal notifying this fact is transmitted from the communication terminal 100A-1 to the terminals.

According to the second embodiment, the sending side communication terminal 100A-1 repeatedly judges whether or not all of the receiving side communication terminals 100A-2 to 100A-4 can communicate. When it judges that there is any communication terminal unable to communicate among the receiving side communication terminals, it postpones the transmission of the data to all of the receiving side communication terminals. Then, when it subsequently judges that the communication terminal judged to be unable to communicate is able to communicate, the sending side communication terminal 100A-1 transmits the data postponed in transmission to all of the receiving side communication terminals. Due to this, when one communication terminal transmits data to a plurality of communication terminals in PoC or other group communication, if there is any communication terminal which temporarily becomes unable to communicate, the communication terminal does not transfer data to any of the receiving side communication terminals. It transmits the data can be transmitted to all of the receiving side communication terminals all together when communication terminal unable to communicate recovers. Therefore, one communication terminal can communicate data to a large number of communication terminals all together well without any delay of the data reception among the receiving side communication terminals. The same storage area provided in the sending side communication terminal for temporarily storing the data for which transmission is being postponed can be shared by the plurality of the receiving side communication terminals, therefore the capacity of the storage area of the sending side can be made smaller.

In the second embodiment, whether or not the sending side communication terminal is holding untransmitted data is notified to all of the receiving side communication terminals. Due to this, when the receiving side communication terminals learn that there is untransferred data remaining in the sending side communication terminal by this notification, they can prohibit data transmission so as to avoid the situation of the sequence of reception ending up changing when the receiving side communication terminals receive consecutive data. For example, the situation where one communication terminal becomes the sending side and sends words, but old speech remaining in another communication terminal before it became the sending side being heard can be prevented.

In the second embodiment, the data for which transmission is being postponed held in the communication server system 200 is suitably discarded according to predetermined conditions. For example, data with a postponement time of transmission exceeding a predetermined time or data exceeding a predetermined amount of data and the oldest in timing of postponement of transmission is discarded. Due to this, it becomes possible to restrict the amount of the data held in the sending side communication terminal due to the postponing of the data transmission, so the storage capacity need not be made wastefully large. Further, since the data oldest in time of postponement of transfer is sequentially discarded, when the temporarily stored data disappears, it becomes possible to connect the data transmitted in real time after that without interruption and transmit the same to the receiving side communication terminals. Due to this, the receiving side communication terminals can treat the data being received at present as if it were data transmitted in real time, therefore voice and other communication for which a real time property is required can be carried out well.

Third Embodiment

Figure 8:
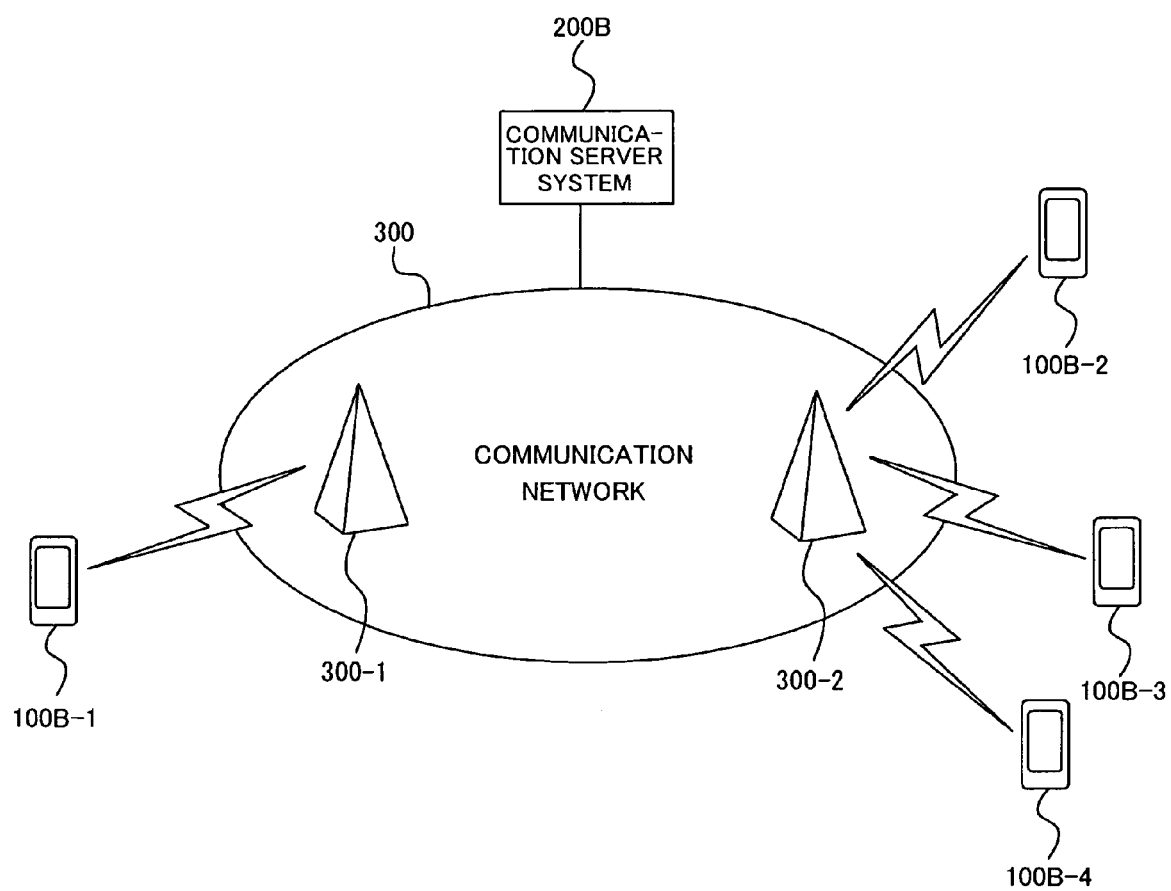
FIG. 8 is a diagram showing an example of the configuration of a communication system of a third embodiment of the present invention.

FIG. 8 is a diagram showing an example of the configuration of a communication system according to a third embodiment of the present invention. The communication system shown in FIG. 8 has a communication network 300, two base stations 300-1 and 300-2, a plurality of communication terminals 100B-1 to 100B-4, and a communication server system 200B. It is the same as the communication system of the first embodiment explained with reference to FIG. 1 except for the communication terminals 100B-1 to 100B-4 explained with reference to FIG. 9 and the communication server system 200B explained with reference to FIG. 10. In the third embodiment, the case using the communication server system 200B for data communication will be explained. The data transmitted in the data communication in the third embodiment includes for example voice in speech, image, and text.

The communication terminals 100B-1 to 100B-4 are for example mobile phones or other wireless communication terminals connected via the base stations 300-1 and 300-2 to the communication network 300. The communication terminals 100B-1 to 100B-4 basically engage in data communication under the control of the communication server system 200B connected to the communication network 300 in the same way as the communication terminals in the first embodiment and the second embodiment. In the third embodiment, as an example, group communication of the "half-duplex communication mode" by PoC is assumed.

The communication terminals 100B-1 to 100B-4 transmit notifications (first notifications) for notifying the completion of reception to the communication server system 200B when finishing receiving data sent from a sending side communication terminal via the communication server system 200 in half-duplex communication by PoC. When transmitting data as sending side communication terminals in the half-duplex communication mode by PoC, the communication terminals 100B-1 to 100B-4 prohibit the new data transmission and, at the same time, display contents indicating this fact in the display units 5 as will be explained in detail with reference to FIG. 9.

When finishing receiving data as receiving side communication terminals in the half-duplex communication by PoC, the communication terminals 100B-1 to 100B-4 prohibit new data transmission and display content indicating this fact on the display units 5. After displaying such data transmission prohibition, when receiving notifications (second notifications) indicating that all of the receiving side communication terminals have finished receiving the data from the communication server system 200B, the communication terminals 100B-1 to 100B-4 lift the prohibition of the data transmission, permit new data transmission, and display content indicating this fact on the display units 5.

The communication server system 200B is a system for controlling communication by PoC by the communication terminals 100B-1 to 100B-4, and functions same as the communication server in the first and second embodiments. When receiving a request of start of communication by PoC from one of the communication terminals 100B-1 to 100B-4, the communication server system 200B calls up the communication terminals of the other parties in response to the request and establishes a communication session. After the establishment of the communication session, the communication server system 200B receives first notifications transmitted for informing the completion of reception from the plurality of communication terminals whenever one communication terminal transmits data to a plurality of communication terminals. Then, when receiving the first notifications from all of the receiving side communication terminals, the communication server system 200B transmits second notifications informing the completion of reception in all of the receiving side communication terminals to the sending side and receiving side communication terminals.

Figure 9:
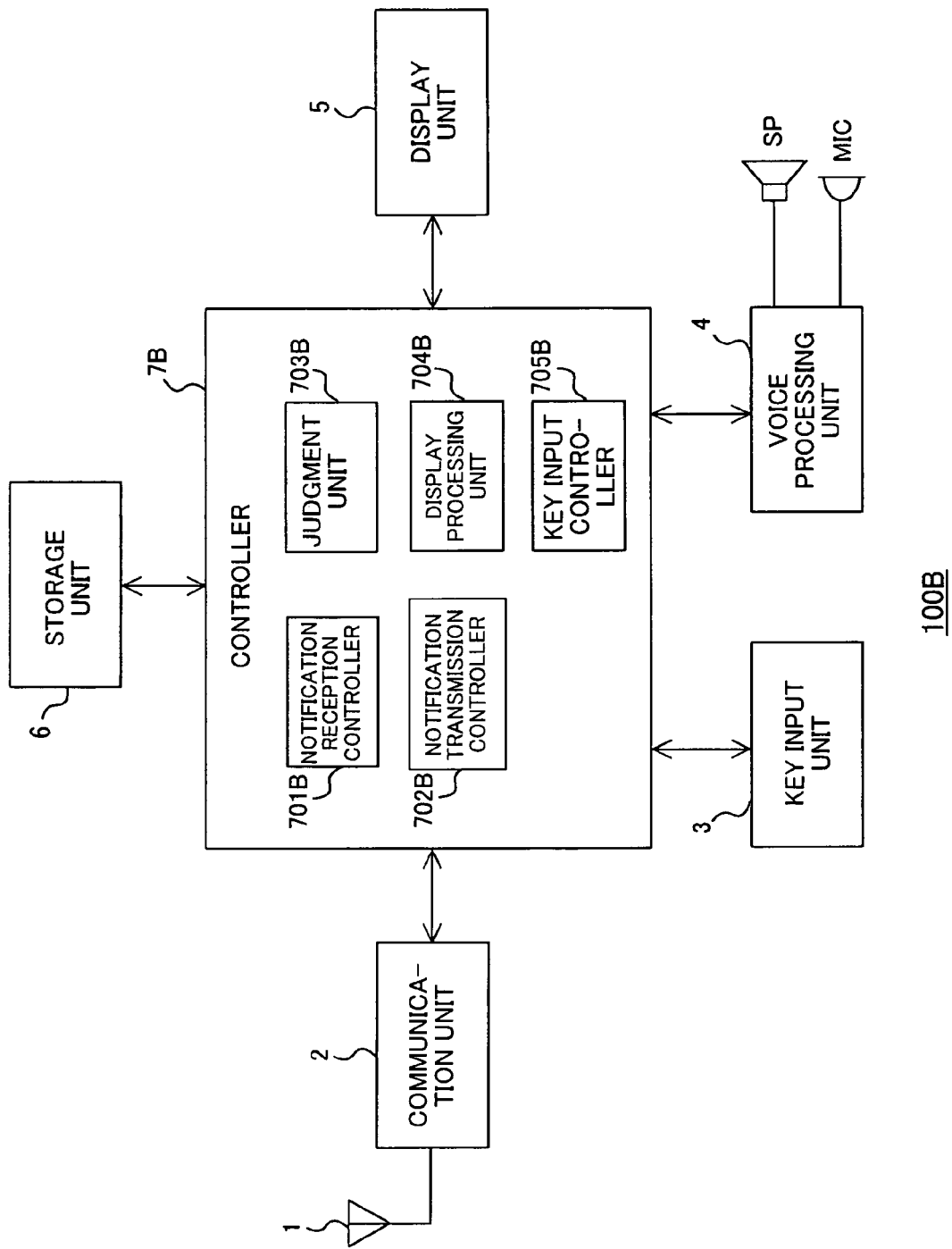
FIG. 9 is a diagram showing an example of the configuration of the communication terminal illustrated in FIG. 8.

The configurations of the communication terminals 100B-1 to 100B-4 will be explained next with reference to FIG. 9. The communication terminal 100B shown in FIG. 9 has an antenna 1, communication unit 2, key input unit 3, voice processing unit 4, display unit 5, storage unit 6, and controller 7B. The communication terminal 100B has the same configuration as that of the controller 7 explained with reference to FIG. 2 except for the controller 7B. Accordingly, the description will be made below focusing on the controller 7B.

The controller 7B performs various processing concerning the overall operation of the communication terminal as well as the controller 7 of the first and second embodiments, and has some different functions. For example, as processing concerning speech, the controller 7B controls the input/output of speech in the voice processing unit 4 and the transmission/reception of voice data in the communication unit 2 so that voice communication is suitably carried out according to a predetermined protocol. Further, as the processing concerning e-mail, the controller 7B controls the input of the text data from the key input unit 3, the display of the sent/received mail at the display unit 5, and the transmission/reception of e-mail in the communication unit 2 for suitable preparation of sent mail, viewing of received mail, and transmission/reception of e-mail. The controller 7B has for example a computer for executing the processing based on programs (operating system, application program, etc.) stored in the storage unit 6 and executes the processing explained above according to the programs.

The processing blocks included in the controller 7B will be explained below.

A judgment unit 703B judges whether or not data finishes being received when the communication terminal receives data as a receiving side in half-duplex communication by PoC. For example, when the data is transmitted as a packet in a predetermined format, the judgment unit 703B judges that the data finishes being received by detecting a predetermined signal indicating a tail of this packet.

A notification transmission controller 702B executes processing for transmitting a first notification for notifying a judgment result via the communication unit 2 to the communication server system 200B when the judgment unit 703B judges the data finishing being received.

A notification reception controller 701B executes processing for receiving a second notification for notifying the data finishing being received in all of the receiving side communication terminals from the communication server system 200B via the communication unit 2 after the notification transmission controller 702B transmits the first notification.

A display processing unit 704B makes the display unit 5 display the prohibition of new data transmission during a period from when the communication terminal has finished receiving data as the receiving side in half-duplex communication by PoC to when the notification reception controller 702B receives the second notification.

The key input controller 705B invalidates the input of the send key of the key input unit 3 during a period from when the communication terminal transmits data as the sending side in half-duplex communication by PoC to when the notification reception controller 702B receives the second notification. Further, it invalidates the input of the send key of the key input unit 3 during a period from when the communication terminal receives data as the receiving side in half-duplex communication by PoC to when the notification reception controller 702B receives the second notification. By the invalidation of the input of the send key, even when the user operates the send key, the communication terminal is prohibited from transmitting the data as the sending side. Note that the key input controller 705B is an embodiment of the transmission prohibiting means of the present invention and an embodiment of the transmission permitting means of the present invention.

Figure 10:
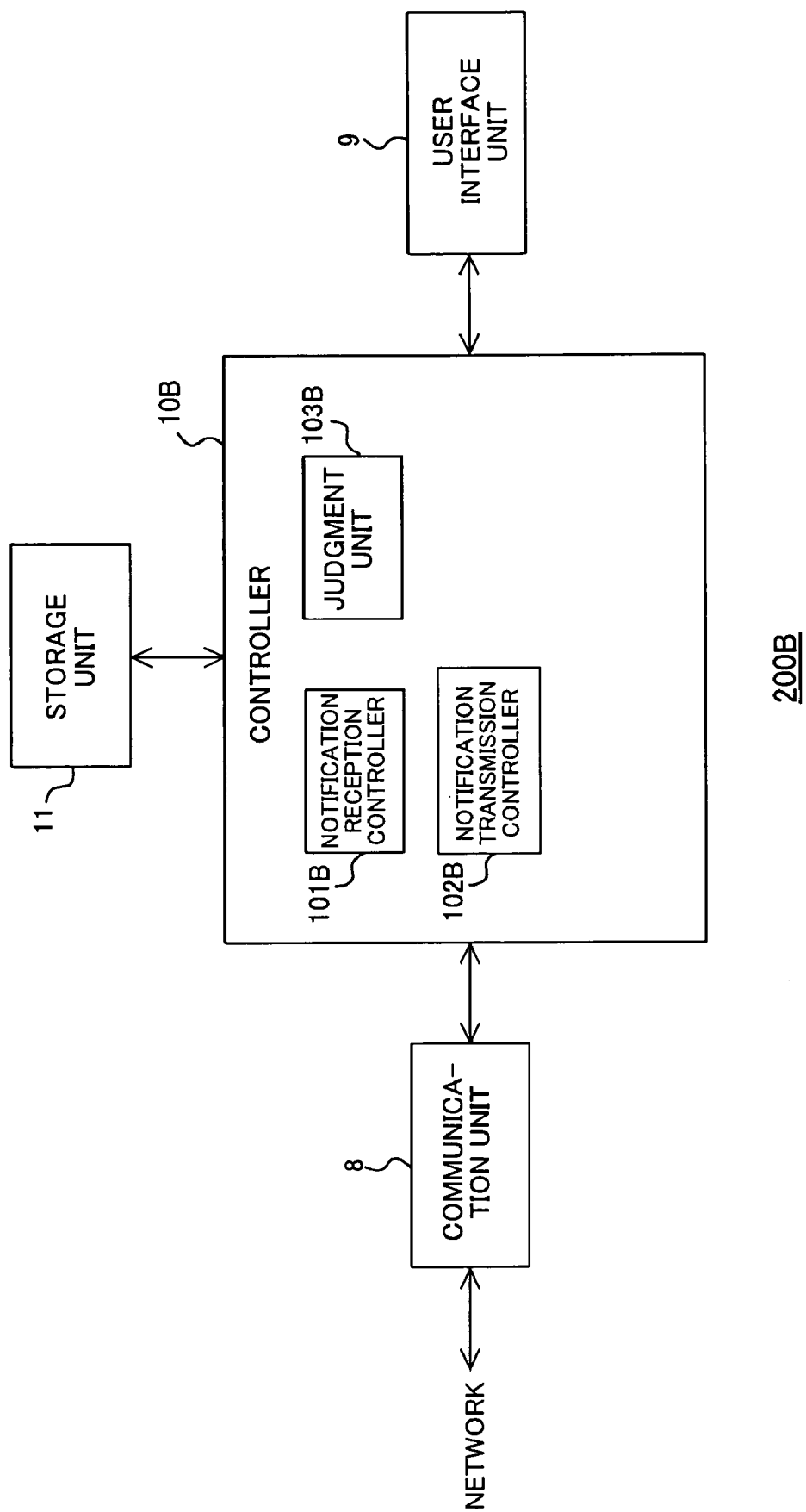
FIG. 10 is a diagram showing an example of the configuration of the communication server system illustrated in FIG. 8.

The configuration of the communication server system 200B will be explained next with reference to FIG. 10. The communication server system 200B has a communication unit 8, user interface unit 9, controller 10B, and storage unit 11. The communication server system 200B illustrated in FIG. 10 has basically the same configuration as that of the communication server system 200 illustrated in FIG. 3 except for the controller 10B. Accordingly, below, the description will be made focusing on the controller 10B.

The controller 10B performs various processing concerning the overall operation of the communication server system 200B. For example, when one communication terminal requests the start of group communication, the controller 10B calls up the communication terminals of the other parties and establishes the communication session. The controller 10B has for example a computer for executing processing based on the programs (operating system, application program etc.) stored in the storage unit 11 and executes the processing according to the programs.

The controller 10B has a notification reception controller 101B, notification transmission controller 102B, and judgment unit 103B as processing blocks relating to communication by PoC.

After one communication terminal transmits data to a plurality of communication terminals, the notification reception controller 101B receives the first notifications for notifying the data finishing being received from that plurality of communication terminals.

The judgment unit 103B judges whether or not all of the receiving side communication terminals finished receiving the data based on the first notifications from the communication terminals received at the notification reception controller 101B.

The notification transmission controller 102B transmits second notifications for notifying the judgment result to the sending side and receiving side communication terminals when the judgment unit 103B judges the data finishing being received at all of the receiving side communication terminals.

Figure 11:
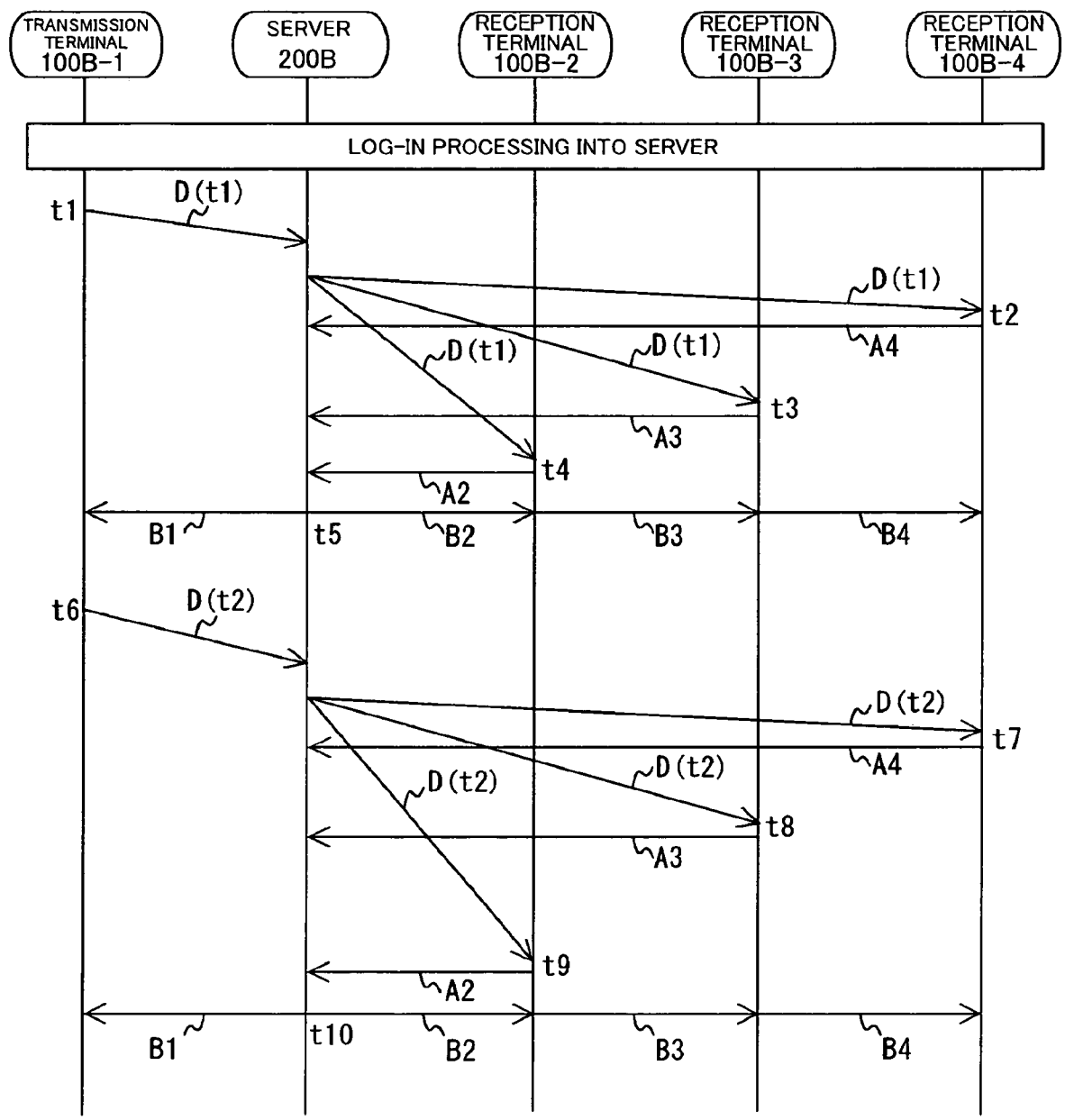
FIG. 11 is a flow chart showing an example of a communication routine in the communication system according to a third embodiment.

The operation in the third embodiment will be explained next with reference to FIG. 11. FIG. 11 is a flow chart showing an example of the communication routine in the communication system according to the third embodiment. In the example of FIG. 11, the communication terminal 100B-1 operates as the sending side and the plurality of communication terminals 100B-2 to 100B-4 operate as the receiving side for voice communication.

Log-In and Establishment of Communication Session

The sending side communication terminal 100B-1 logs into the communication server system 200B and requests the callup of the communication terminals of the other parties. The communication server system 200B calls up the receiving side communication terminals in response to this request and establishes the communication session. The operation up to this point constitutes the processing for log-in to the communication server system 200.

The sending side communication terminal 100B-1 transmits data D(t1) addressed to the receiving side communication terminals 100B-2 to 100B-4 at a time t1. When transmitting the data D(t1), the sending side communication terminal 100B-1 invalidates the input of the send key of the key input unit 3 and prohibits new data transmission. Further, at this time, the sending side communication terminal 100B-1 displays information indicating that new data transmission is prohibited on the display unit 5.

Figure 12B:
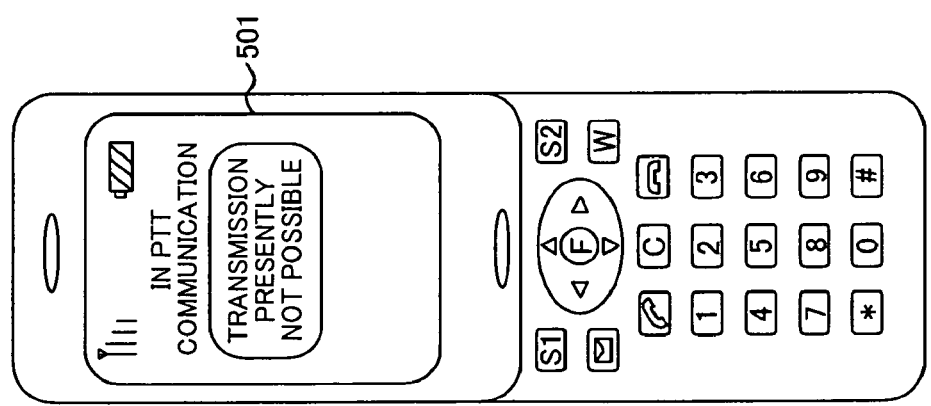
FIGS. 12A and 12B are diagrams illustrating an example of a screen display of the communication terminal at the time of group communication in the first embodiment.
Figure 12A:
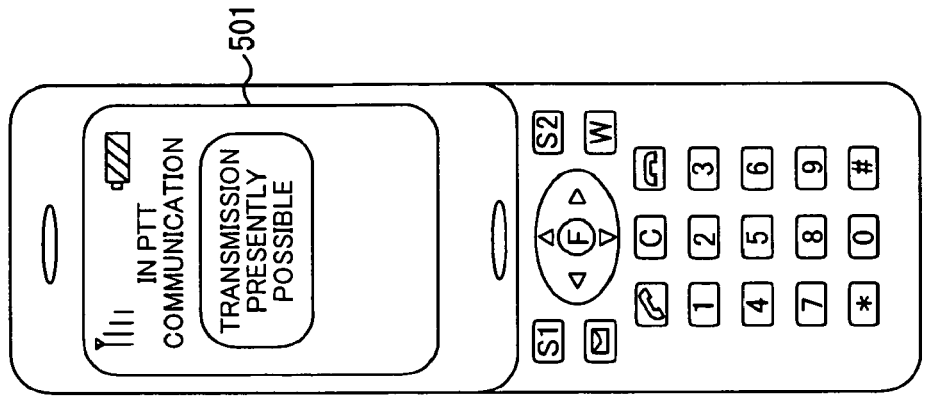

FIG. 12A is a diagram illustrating an example of the screen display of the communication terminal when transmission is prohibited in group communication. In the example of FIG. 12A, a message of the following text is displayed on a screen 501 of the display unit 5.

"TRANSMISSION PRESENTLY NOT POSSIBLE"

The invention is not limited to this example. It is also possible to display that transmission is prohibited by for example a symbol, graphic, picture, etc. on the screen 501 of the display unit 5.

The data D(t1) transmitted from the sending side communication terminal 100B-1 is simultaneously transferred to the plurality of communication terminals 100B-2 to 100B-4 via the communication server system 200B. The communication terminal 100B-4 finishes receiving the data D(t1) at a time t2, the communication terminal 100B-3 finishes receiving the data D(t1) at a time t3, and the communication terminal 100B-2 finishes receiving the data D(t1) at a time t4. The communication terminals finishing reception transmit first notifications for notifying this fact to the communication server system 200B (A2, A3, A4).

The communication terminals 100B-2 to 100B-4 invalidate the input of the send keys of their key input units 3 when finishing receiving the data D(t1) and prohibit the new data transmission. At this time, the communication terminals 100B-2 to 100B-4 display information indicating that new data transmission is prohibited on the display units 5 as shown in for example FIG. 12A.

When receiving the first notifications (A1, A2, A3) from all receiving side communication terminals 100B-2 to 100B-4, the communication server system 200B transmits second notifications for notifying that all of the receiving side communication terminals 100B-2 to 100B-4 have finished receiving the data to the sending side communication terminal 100B-1 and the receiving side communication terminals 100B-2 to 100B-4 (B1, B2, B3, B4).

The sending side communication terminal 100-1 and the receiving side communication terminals 100B-2 to 100B-4 invalidate the input of send keys of their key input units 3 when receiving the second notifications (B1, B2, B3, B4). Due to this, the sending side communication terminal 100B-1 and the receiving side communication terminals 100B-2 to 100B-4 lift the prohibition of the data transmission and permit new data transmission. At this time, the sending side communication terminal 100B-1 and the receiving side communication terminals 100B-2 to 100B-4 display information indicating that new data transmission is permitted on the display units 5.

FIG. 12B is a diagram illustrating an example of the screen display of the communication terminal when the prohibition of data transmission is lifted in the group communication. In the example of FIG. 12B, a message of the following text is displayed on the screen 501 of the display unit 5.

"TRANSMISSION PRESENTLY POSSIBLE"

The screen 501 of the display unit 5 may also use for example a symbol, graphic, picture, etc. to display that the prohibition of data transmission is lifted. The display concerning the data transmission prohibition may also be erased from the screen 501 of the display unit 5 to indicate the lifting of the prohibition of transmission of data.

According to the third embodiment, when one communication terminal (sending side communication terminal) transmits data to a plurality of communication terminals (receiving side communication terminals), the sending side communication terminal invalidates the send key during the period from when it transmits the data to when it receives the second notification indicating that all of the receiving side communication terminals have finished receiving the data from the communication server system. Due to this, during the period until all of the receiving side communication terminals have finished receiving the data, the transmission of new data by the sending side communication terminal is prohibited. The prohibition of the data transmission at the sending side communication terminal is lifted by receiving the second notification from the communication server system. The receiving side communication terminals also invalidate their send keys during the period from when they finish receiving the data to when receiving the second notifications from the communication server system. Due to this, the transmission of new data by the receiving side communication terminals is prohibited during the period until the receiving side communication terminals have finished receiving the data. The prohibition of the data transmission at the receiving side communication terminals is lifted by receiving the second notification from the communication server system.

According to the third embodiment, when one communication terminal is transmitting data are transmitted to a plurality of communication terminals all together in group communication of the half-duplex communication mode, the inconvenience of new data transmission by a communication terminal in the group irrespective of the fact that all of the receiving side communication terminals have not finished receiving data and the delay of the data communication can be eliminated.

The sending side communication terminal sends a notification indicating that the new data transmission is prohibited by the notifying means in the period from which it transmits data to when it receives the second notification indicating that all of the receiving side communication terminals have finished receiving the data from the communication server system, while sends a notification indicating that new data transmission is permitted by the notifying means when receiving the second notification. Each receiving side communication terminal sends a notification indicating that new data transmission is prohibited by the notifying means during the period from when it finishes receiving the data to when it receives the second notification from the communication server system and sends a notification indicating the permission of new data transmission by the notifying means when receiving the second notification. Due to this, when one communication terminal transmits data to a plurality of communication terminals all together in half-duplex group communication, the user of each terminal can learn by the notification of the notifying means the timing when all of the receiving side communication terminals have finished receiving the data and new data transmission becomes possible, therefore the users can continue the communication without confusion.

Modifications

When the amount of the data being transmitted and received is small, sometimes there is relatively little variation in the timing of finishing reception among the terminals, so the transmission of the notifications as described above becomes unnecessary. Therefore, it is also possible to have the communication terminals and the communication server system send notifications concerning the completion of reception and display the prohibition of data transmission only when the transmitted and received data is for example data of type having a relatively large size such as image data or when that transmitted and received data is larger than a predetermined size. For example, as a modification of the third embodiment, it is also possible to have the communication terminals 100B-1 to 100B-4 display that data transmission is prohibited both on the sending side and the receiving side only when the transmitted and received data is for example data of type having a relatively large size such as image data or when that transmitted and received data is larger than a predetermined size. Further, in this case, the receiving side communication terminals transmit the first notifications informing the completion of reception, and the communication server system 200B transmits the second notification informing the completion of reception by all terminals.

Fourth Embodiment

Figure 13:
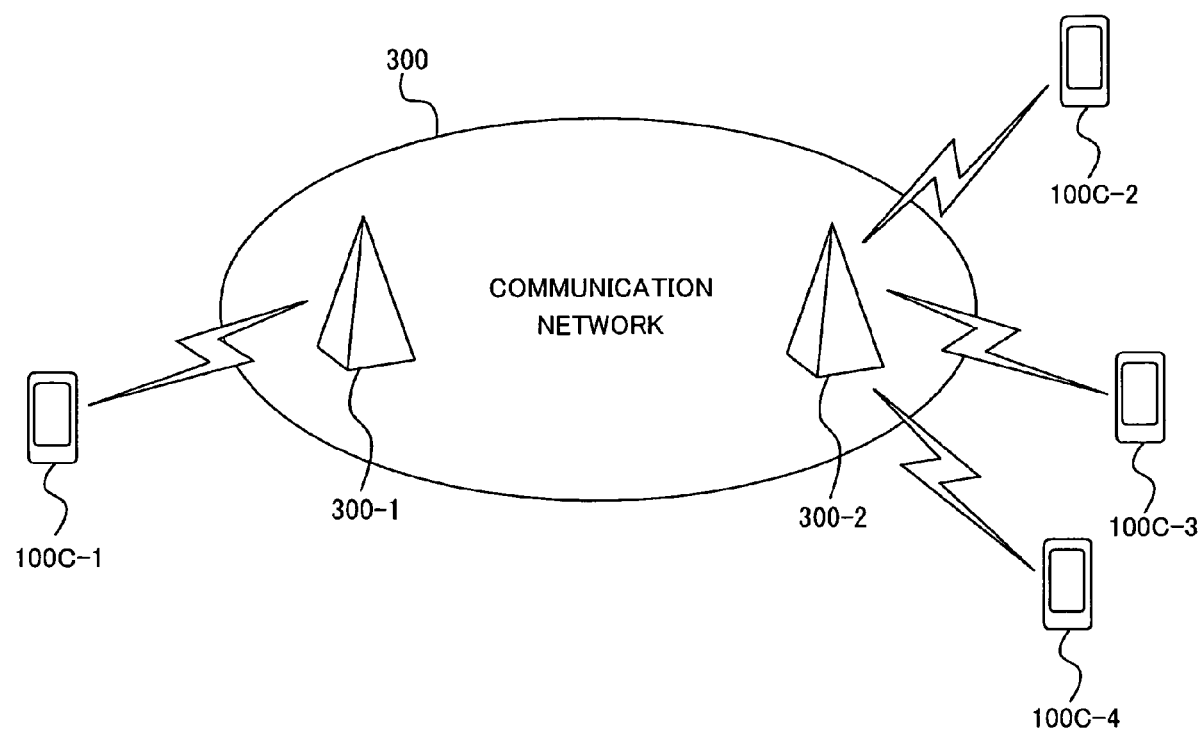
FIG. 13 is a diagram showing an example of the configuration of a communication system of a fourth embodiment of the present invention.

A fourth embodiment will be explained next with reference to FIG. 13. In the communication system according to the third embodiment, the data communication was carried out via a communication server system, but in the communication system according to the fourth embodiment, the data communication is directly carried out between the communication terminals without going through a communication server system. As shown from FIG. 13, the communication server system is not provided—a plurality of communication terminals 100C-1 to 100C-4 directly communicate with each other via the communication network 300. As an example, the communication terminal 100C transmits the data, and the communication terminals 100C-2 to 100C-4 receive the data.

When transmitting data to the receiving side communication terminals 100C-2 to 100C-4, the sending side communication terminal 100C-1 prohibits new data transmission and displays information indicating this on the display unit 5 as shown in FIG. 12A.

When finishing receiving data sent from the sending side communication terminal 100C-1, the receiving side communication terminals 100C-2 to 100C-4 transmit the first notifications informing the completion of reception to the sending side communication terminal 100C-1. When finishing receiving data sent from the sending side communication terminal 100C-1, the receiving side communication terminals 100C-2 to 100C-4 prohibit new data transmission and display information indicating that fact on the display units 5.

The sending side communication terminal 100C-1 receives the first notifications transmitted for informing the completion of reception from the receiving side communication terminals 100C-2 to 100C-4. When receiving the first notifications from all of the receiving side communication terminals, the sending side communication terminal 100C-1 transmits the second notifications informing the completion of reception at all of the receiving side communication terminals to the receiving side communication terminals. Further, the sending side communication terminal 100C-1 lifts the prohibition of the data transmission to permit new data transmission and displays information indicating that fact on the display unit 5.

When receiving the second notifications sent from the sending side communication terminal 100C-1, the receiving side communication terminals 100C-2 to 100C-4 lift the prohibition of data transmission to permit new data transmission and display information indicating that fact on the display units 5.

Figure 14:
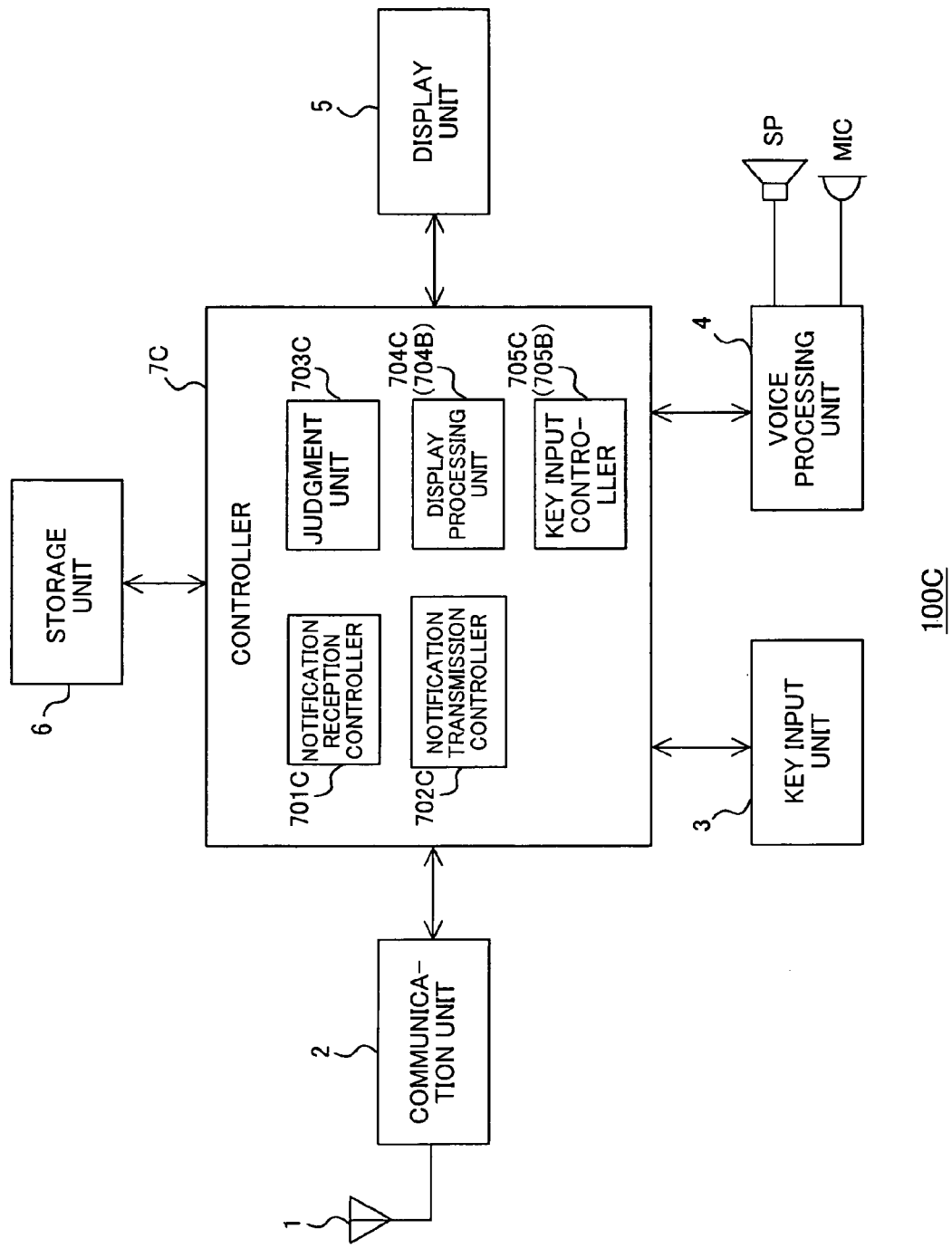
FIG. 14 is a diagram showing an example of the configuration of the communication terminal illustrated in FIG. 13.

FIG. 14 is a diagram showing an example of the configuration of the communication terminal 100C in the fourth embodiment. The communication terminal 100C in the fourth embodiment shown in FIG. 14 is the same as the communication terminal 100B explained with reference to FIG. 9 except for the controller 7C.

The controller 7C performs various processing concerning the overall operation of the communication terminal. The controller 7C has for example a computer for executing processing based on the programs stored in the storage unit 6 and executes the processing according to the programs.

The controller 7C has a notification reception controller 701C, notification transmission controller 702C, judgment unit 703C, display processing unit 704C, and key input unit 705C as processing blocks involved in group communication by PoC. The display processing unit 704C and the key input unit 705C are the same as the display processing unit 704B and the key input unit 705B in the controller 7B explained with reference to FIG. 9. Below, an explanation will be given of the operations of the notification reception controller 701C, notification transmission controller 702C, and judgment unit 703C for the case where the communication terminal transmits data and the case where it receives data.

Processing when Communication Terminal Transmits Data

The notification reception controller 701C receives the first notifications notifying that data has finished being received from a plurality of communication terminals after the communication terminal transmits the data to a plurality of communication terminals. The judgment unit 703C judges whether all of the receiving side communication terminals have finished receiving the data based on the first notifications from the communication terminals received at the notification reception controller 701C. The notification transmission controller 702C transmits the second notifications for notifying the result of this judgment to the receiving side communication terminals when the judgment unit 703C judges that all of the receiving side communication terminals have finished receiving the data.

Processing when Communication Terminal Receives Data

The judgment unit 703C judges whether or not the communication terminal has finished receiving data sent from the sending side communication terminal. For example, when the data is transmitted as a packet in a predetermined format, it detect a predetermined signal indicating the tail of this packet so as to judge reception is finished. The notification transmission controller 702C transmits the first notification for notifying the result of the judgment to the sending side communication terminal when the judgment unit 703C judges that the data has finished being received. The notification reception controller 701C receives the second notification for notifying that all of the receiving side communication terminals have finished receiving the data from the sending side communication terminal after the notification transmission controller 702C transmits the first notification.

Figure 15:
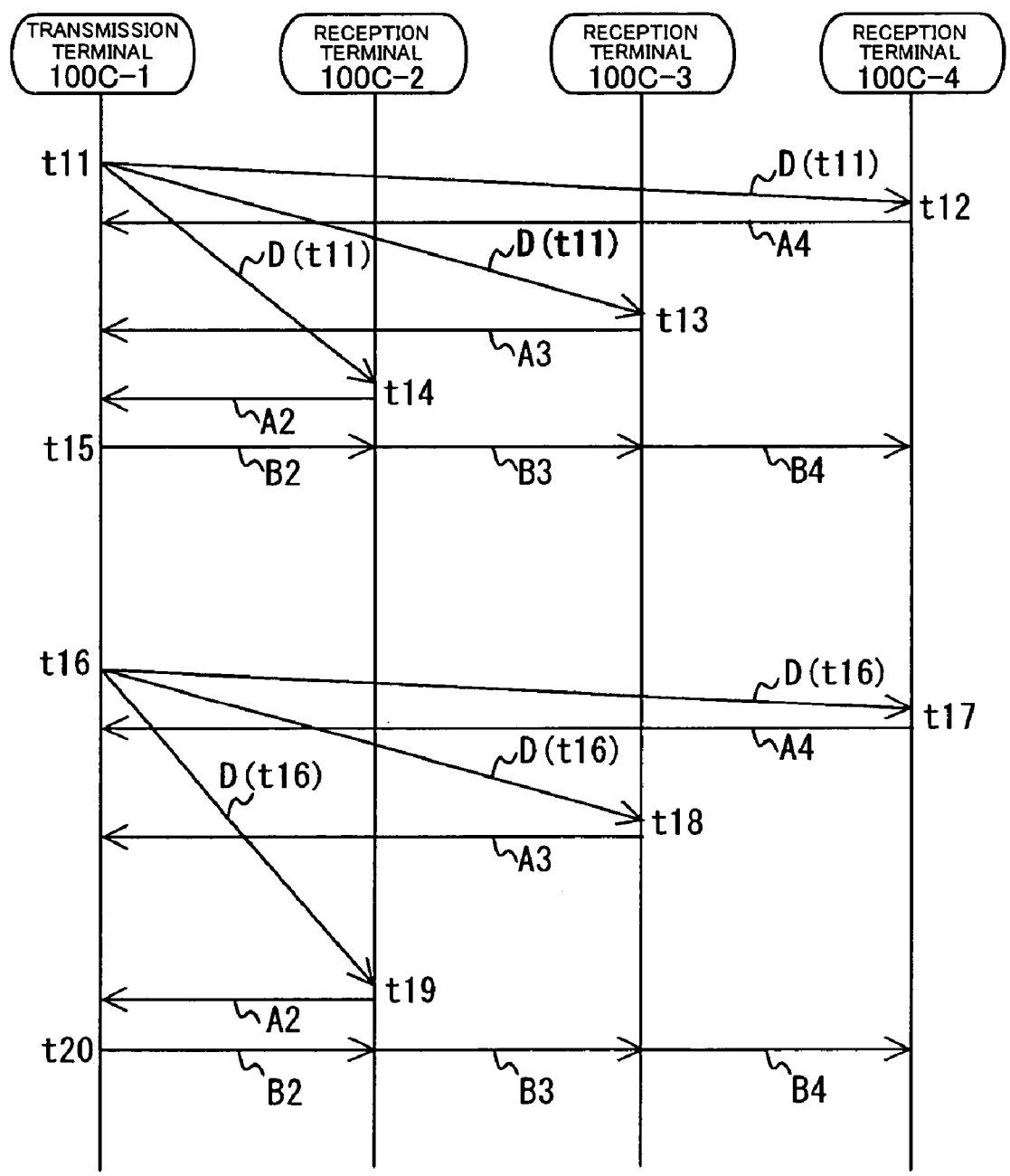
FIG. 15 is a flow chart showing an example of a communication routine in the communication system according to a fourth embodiment.

The operation of the communication system in the fourth embodiment will be explained next with reference to FIG. 15. FIG. 15 is a flow chart showing an example of the communication routine in the communication system according to the fourth embodiment. In the example illustrated in FIG. 15, the communication terminal 100C-1 operates as the sending side, and the communication terminals 100C-2 to 100C-4 operate as the receiving side for voice communication.

The sending side communication terminal 100C-1 transmits data D(t11) addressed to the receiving side communication terminals 100C-2 to 100C-4 at a time t11. When transmitting the data D(t11), the communication terminal 100C-1 invalidates the input of the send key of the input unit 3 and prohibits new data transmission. At this time, the communication terminal 100C-1 displays the prohibition of new data transmission on the display unit 5 as exemplified in FIG. 12A.

The data D(t11) transmitted from the sending side communication terminal 100C-1 is transferred to the receiving side communication terminals. The communication terminal 100C-4 finishes receiving the data D(t11) at a time t12, the communication terminal 100C-3 finishes receiving the data D(t11) at a time t13, and the communication terminal 100C-2 finishes receiving the data D(t11) at a time t14. The communication terminals finishing reception transmit first notifications for notifying this fact to the sending side communication terminal 100C-1 (A2, A3, A4).

The receiving side communication terminals 100C-2 to 100C-4 invalidate the input of the send keys of their key input units 3 when finishing receiving the data D(t11) and prohibit new data transmission. At this time, the communication terminals 100C-2 to 100C-4 display the prohibition of new data transmission on the display units 5 as shown in for example FIG. 12A.

When receiving the first notifications (A2, A3, A4) from all of the receiving side communication terminals, the sending side communication terminal 100C-1 transmits the second notifications for notifying that all of the receiving side communication terminals have finished receiving the data to the receiving side communication terminals 100C-2 to 100C-4 (B2, B3, B4). Further, the sending side communication terminal 100C-1 validates the input of the send key of the key input unit 3 and permits new data transmission and displays the permission of new data transmission on the display unit 5.

The receiving side communication terminals 100C-2 to 100C-4 receiving the second notifications (B2, B3, B4) validate the inputs of send keys of their key input units 3 and permit new data transmission and display that new data transmission is permitted on the display units 5.

According to the fourth embodiment, when one communication terminal (sending side) transmits data to a plurality of communication terminals (receiving side), the sending side communication terminal invalidates the send key during the period from when the terminal transmits the data to when it receives the first notifications indicating that the data has finished being received from all of the receiving side communication terminals. Due to this, during the period until all of the receiving side communication terminals have finished receiving the data, new data transmission by the sending side communication terminal is prohibited. The prohibition of the data transmission in the sending side communication terminal is lifted by receiving the first notifications from all of the receiving side communication terminals. On the other hand, the receiving side communication terminals invalidate the send keys during the period from when the communication terminals have finished receiving the data to when they receive second notifications indicating that all of the receiving side communication terminals have finished receiving the data from the sending side communication terminal. Due to this, during the period until all of the receiving side communication terminals have finished receiving the data, new data transmission by the receiving side communication terminals is prohibited. The prohibition of the data transmission at the receiving side communication terminals is lifted by receiving the second notifications from the sending side communication terminal. Accordingly, according to the fourth embodiment, when one communication terminal transmits data to a plurality of communication terminals all together in group communication of a half-duplex communication mode, the inconvenience of new data transmission by a communication terminal in the group irrespective of the fact that all of the receiving side communication terminals have not finished receiving data and the delay of the data communication can be eliminated.

The sending side communication terminal sends a notification by the notifying means indicating that new data transmission is prohibited during the period from when it transmits data to when it receives the first notifications indicating that the data has finished being received from all of the receiving side communication terminals and sends a notification by the notifying means indicating that new data transmission is permitted when receiving the first notifications from all of the receiving side communication terminals. The receiving side communication terminals send notifications by the notifying means indicating that new data transmission is prohibited during the period from when they finish receiving the data to when they receive second notifications indicating that all of the receiving side communication terminals have finished receiving the data from the sending side communication terminal and send notifications by the notifying means indicating the permission of new data transmission when receiving these second notifications. Due to this, when one communication terminal transmits data to a plurality of communication terminals all together in group communication of the half-duplex communication mode, the timing when all of the receiving side communication terminals have finished receiving the data and new data transmission becomes possible can be determined by the users of the terminals by the notification of the notifying means, therefore the users can continue communication without confusion.

Modifications

When the amount of the data being transmitted and received is small, sometimes there is relatively little variation in the timing of finishing reception among the terminals, so the transmission of the notifications as described above becomes unnecessary. Therefore, it is also possible to have the communication terminals and the communication server system send notifications concerning the completion of reception and display the prohibition of data transmission only when the transmitted and received data is for example data of type having a relatively large size such as image data or when that transmitted and received data is larger than a predetermined size. For example, as a modification of the fourth embodiment, it is also possible to have the communication terminals 100C-1 to 100C-4 display that data transmission is prohibited both on the sending side and the receiving side only when the transmitted and received data is for example data of type having a relatively large size such as image data or when that transmitted and received data is larger than a predetermined size. Further, in this case, the receiving side communication terminals transmit the first notifications informing that they have finished receiving the data, and the sending side communication terminal transmits the second notification informing that all terminals have finished receiving the data. Due to this, when transmitting data having a relatively small variation of reception completion time among the terminals, the transmission of notifications as explained above (first and second notifications) and the display of the data transmission prohibition are not carried out, so the processing load of the communication terminals and the communication server system can be reduced.

While the invention has been described with reference to specific embodiments chosen for purpose of illustration, it should be apparent that numerous modifications could be made thereto by those skilled in the art without departing from the basic concept and scope of the invention.

For example, in the above embodiments, the example of applying the present invention to group communication by PoC was explained, but the present invention is not limited to this. The present invention can be applied to other various group communications for one-to-many data communication. The processing of the controllers 7 and 7A of the communication terminals and the processing of the controller 10 of the communication server system may all be realized by hardware or at least a portion thereof may be realized by a computer based on programs. The communication terminal of the present invention is not limited to a mobile phone. The present invention can be widely applied to terminals having communication functions such as personal digital assistants (PDA).

In the above mentioned, this invention is explained dividing each embodiment. However, this invention can be achieved even if it composes to have both respectively the first and the third embodiments, or the second and the forth embodiments and the like.

It should be understood by those skilled in the art that various modifications, combinations, sub-combinations and alterations may occur depending on design requirements and other factors insofar as they are within the scope of the appended claims or the equivalents thereof.

The invention claimed is:

1. A data communication method of a half-duplex mode where transmission and reception cannot be simultaneously performed when a first communication terminal and a plurality of second communication terminals communicate with each other via a communication server system, comprising transmitting data from a first communication terminal to a plurality of second communication terminals via the communication server system;

invalidating the input of a send key of an input unit of the first communication terminal after the first communication terminal starts transmitting the data;

transmitting a first notification for notifying the completion of reception from each of the plurality of second communication terminals to the communication server system when each of the plurality of second communication terminals finishes receiving the data from the first communication terminal and invalidating the input of a send key of an input unit of each of the plurality of second communication terminals when each of the second communication terminals finishes receiving the data;

transmitting a second notification for notifying that all of the plurality of second communication terminals finished receiving the data from the communication server system to the first communication terminal and each of the plurality of second communication terminals when the communication server system receives the first notification from all of the plurality of second communication terminals; and permitting the input of the send key to all of the plurality of second communication terminals when all of the plurality of second communication terminals receive the second notification from the communication server system.

2. The data communication method as set forth in claim 1, further comprising having the first communication terminal notify the second communication terminals of information indicating that the transmission of new data is prohibited, having each of the plurality of second communication terminals notify the first communication terminal of information indicating that the transmission of new data is prohibited, and having the first communication terminal and each of the plurality of second communication terminals notify the fact of permitting the transmission of new data.

3. The data communication method as set forth in claim 2, further comprising repeatedly judging in the first communication terminal whether each of the plurality of second communication terminals can communicate with the first communication terminal.

4. The data communication method as set forth in claim 3, further comprising transmitting the data from the first communication terminal to all of the plurality of second communication terminals when all of the plurality of second communication terminals are judged to be able to communicate with the first communication terminal.

5. The data communication method as set forth in claim 3, further comprising storing the data in the first communication terminal and postponing the transfer of the data when one or more of the plurality of second communication terminals are not able to communicate with the first communication terminal.

6. The data communication method as set forth in claim 5, wherein, when the data transfer is postponed, the first communication terminal notifies the fact of holding untransferred data to the plurality of second communication terminals.

7. The data communication method as set forth in claim 5, further comprising deleting the data in the first communication terminal with a postponement time exceeding a predetermined time and/or an excess amount of data from a predetermined amount of data in data for which transfer is postponed.

8. The data communication method as set forth in claim 3, further comprising transmitting the data from the first communication terminal to all of the plurality of second communication terminals when all of the plurality of second communication terminals are judged to be able to communicate with the first communication terminal after the a postponement of transferring the data.

9. The data communication method as set forth in claim 1, further comprising repeatedly judging whether each of the plurality of second communication terminals can communicate with the communication server system.

10. The data communication method as set forth in claim 9, further comprising postponing the transfer of the data to the plurality of second communication terminals from the first communication terminal and storing the data when one or more of the plurality of second communication terminals are judged unable to communicate.

11. The data communication method as set forth in claim 10, further comprising transferring the data stored in the communication server system to all of the second communication terminals when all of the second communication terminals are judged to be able to receive the data after the postponement of transferring the data.

12. The data communication method as set forth in claim 10, wherein when the communication server system postpones transfer of the data, the communication server system notifies the fact of holding untransferred data to the first communication terminal and/or the plurality of second communication terminals.

13. The data communication method as set forth in claim 10, further comprising deleting data in the communication server system with a postponement time exceeding a predetermined time and/or an excess amount of data from a predetermined amount of data in data for which transfer is postponed.

14. The data communication method as set forth in claim 9, further comprising transferring the data from the communication server system to all of the second communication terminals when all of the second communication terminals are judged to be able to communicate with the communication server system.

15. A data communication method of a half-duplex mode where transmission and reception cannot be simultaneously performed when a first communication terminal and a plurality of second communication terminals communicate with each other, comprising transmitting data from a first communication terminal to a plurality of second communication terminals;

invalidating the input of a send key of an input unit of the first communication terminal after the first communication terminal starts transmitting the data;

transmitting a first notification for notifying the completion of reception from each of the plurality of second communication terminals to the first communication terminal and invalidating the input of a send key of an input unit of each of the plurality of second communication terminals when each of the plurality of second communications finishes receiving the data from the first communication terminal;

permitting new data transmission and transmitting a second notification for notifying that all of the plurality of second communication terminals finished receiving the data when the first communication terminal receives the first notification from all of the plurality of second communication terminals; and permitting the input of the send key to all of the plurality of second communication terminals when each of the plurality of second communication terminals receives the second notification from the first communication terminal.

16. The data communication method as set forth in claim 15, further comprising having the first communication terminal notify the fact that transmission of new data is prohibited, having each of the plurality of second communication terminals notify the fact that transmission of new data is prohibited, having the first communication terminal notify the fact of permitting the transmission of new data, and having each of the plurality of second communication terminals notify the fact of permitting the transmission of new data.

17. A communication terminal constituting a first communication terminal when a first communication terminal transmits data to a plurality of second communication terminals in data communication of a half-duplex mode where transmission and reception cannot be performed simultaneously when the first communication terminal and the plurality of second communication terminals communicate with each other, comprising a processor and a memory, wherein the memory stores code for:
- a communicating part;
- a transmission prohibiting part configured to invalidate the input of a send key after the communicating part has transmitted the data;
- a notification reception controlling part, wherein said notification reception controlling part receives a first notification for notifying that data has finished being received from each of the plurality of second communication terminals via the communicating part;
- a judging part, wherein said judging part judges whether or not all of the plurality of second communication terminals have finished receiving the data based on the first notification received at the notification reception controlling part;
- a transmission permitting part, wherein said transmission permitting part permits the input of a send key when the completion of reception of all of the plurality of second communication terminals is judged at the judging part; and
- a notification transmission controlling part, wherein said notification transmission controlling part transmits a second notification for notifying that all of the plurality of communication terminals finished receiving the data to each of the plurality of second communication terminals via the communicating part when the completion of reception of all of the plurality of second communication terminals is judged at the judging part.

18. The communication terminal as set forth in claim 17, wherein
the communicating part notifies the fact that the transmission of new data is prohibited when transmitting data to a plurality of communication terminals and notifies the fact of permitting the transmission of new data when judging at the judging part that all terminals have finished receiving the data.

19. The communication terminal as set forth in claim 17, wherein the judging part repeatedly judges whether each of the plurality of second communication terminals can communicate.

20. The communication terminal as set forth in claim 19, further comprising:
- a holding part operable to hold the data to be transmitted to the plurality of communication terminals; and
- a transmitting part for transmitting the data to be transmitted to all of the plurality of second communication terminals.

21. The communication terminal as set forth in claim 20, further comprising a communicating part operable to notify the fact of holding untransferred data to the plurality of second communication terminals when the holding part holds and postpones transfer of the data.

22. The communication terminal as set forth in claim 20, further comprising a controlling part operable to control the holding part so as to discard data with a postponement time exceeding a predetermined time and/or an excess amount of data from a predetermined amount of data in data for which transfer is postponed at the holding part.

23. A communication terminal constituting a second communication terminal when a first communication terminal transmits data to a plurality of second communication terminals in data communication of a half-duplex mode where transmission and reception cannot be performed simultaneously when the first communication terminal and the plurality of second communication terminals communicate with each other via a communication server system, comprising a processor and a memory, wherein the memory stores code for:
- a communicating part configured to transfer data with the communication server system;
- a judging part, wherein said judging part judges whether or not data has finished being received when receiving data transmitted from the first communication terminal;
- a transmission prohibiting part configured to invalidate the input of a send key when data finishing being received is judged at the judging part;
- a notification transmission controlling part, wherein said notification transmission controlling part transmits a first notification for notifying the data finishing being received to the communication server system via the communicating part when data finishing being received is judged at the judging part;
- a notification reception controlling part, wherein said notification reception controlling part receives a second notification for notifying that all of the plurality of second communication terminals have finished receiving the data from the communication server system via the communicating part after transmitting the first notification; and
- a transmission permitting part, wherein said transmission permitting part permits the input of a send key when receiving the second notification from the communication server system at the notification reception controlling part.

24. A communication terminal constituting a second communication terminal when a first communication terminal transmits data to a plurality of second communication terminals in data communication of a half-duplex mode where transmission and reception cannot be performed simultaneously when the first communication terminal and the plurality of second communication terminals communicate with each other, comprising a processor and a memory, wherein the memory stores code for:
- a communicating part configured to transfer data with the first communication terminal;
- a judging part, wherein said judging part judges whether or not data has finished being received when receiving data transmitted from the first communication terminal;
- a transmission prohibiting part configured to invalidate the input of a send key when the data finishing being received is judged at the judging part;
- a notification transmission controlling part, wherein said notification transmission controlling part transmits a first notification for notifying the completion of the reception of the data to the first communication terminal via the communicating part when the data finishing being received is judged at the judging part;
- a notification reception controlling part, wherein said notification reception controlling part receives a second notification for notifying that the data has finished being received in all of the plurality of second communication terminals from the first communication terminal via the communicating part after transmitting the first notification; and
- a transmission permitting part, wherein said transmission permitting part permits the input of a send key when receiving the second notification from the first communication terminal at the notification reception controlling part.

25. A communication terminal as set forth in claim 24, wherein the communicating part notifies the fact of prohibiting the transmission of new data when the judging part judges that the data transmitted from the communication terminal has finished being received and notifies the fact of permitting the transmission of new data when the notification reception controlling part receives the second notification.

* * * * *